(12) United States Patent
Newman et al.

(10) Patent No.: US 11,321,677 B1
(45) Date of Patent: May 3, 2022

(54) ACTION REMINDER DEVICE AND METHOD

(71) Applicants: Julia Jester Newman, Los Angeles, CA (US); Russell Grant Newman, Los Angeles, CA (US)

(72) Inventors: Julia Jester Newman, Los Angeles, CA (US); Russell Grant Newman, Los Angeles, CA (US)

( * ) Notice: Subject to any disclaimer, the term of this patent is extended or adjusted under 35 U.S.C. 154(b) by 539 days.

(21) Appl. No.: 15/973,607

(22) Filed: May 8, 2018

Related U.S. Application Data

(60) Provisional application No. 62/503,793, filed on May 9, 2017.

(51) Int. Cl.
| | | |
|---|---|---|
| *G06Q 10/10* | (2012.01) | |
| *G06F 3/147* | (2006.01) | |
| *G06F 3/023* | (2006.01) | |
| *G08B 21/24* | (2006.01) | |

(52) U.S. Cl.
CPC ......... *G06Q 10/1097* (2013.01); *G06F 3/023* (2013.01); *G06F 3/147* (2013.01); *G08B 21/24* (2013.01)

(58) Field of Classification Search
CPC ..... G06Q 10/1097; G06F 3/147; G06F 3/023; G08B 21/24
See application file for complete search history.

(56) References Cited

U.S. PATENT DOCUMENTS

| | | |
|---|---|---|
| 4,005,571 A | 2/1977 | Wolff |
| 4,490,711 A | 12/1984 | Johnston |
| 4,690,566 A | 9/1987 | Robertson |
| 4,853,854 A | 8/1989 | Behar et al. |
| 5,020,037 A | 5/1991 | Raven |
| 5,097,429 A | 5/1992 | Wood et al. |
| 5,124,957 A | 6/1992 | Owens et al. |
| 5,313,439 A | 5/1994 | Albeck |
| 5,602,802 A | 2/1997 | Leigh-Spencer et al. |
| 5,602,963 A | 2/1997 | Bissonnette et al. |

(Continued)

FOREIGN PATENT DOCUMENTS

| | | |
|---|---|---|
| EP | 2665023 A1 | 11/2003 |
| EP | 1441300 A1 | 7/2004 |

(Continued)

OTHER PUBLICATIONS

BTBSIGN, 9-Digit Countup and Countdown Timer, 2 page product description, obtained via the Internet, Copyright 2005-2010.

(Continued)

*Primary Examiner* — David D Davis
(74) *Attorney, Agent, or Firm* — Michael H. Jester

(57) ABSTRACT

A standalone electronic passive reminder device allows a user to manually actuate a first switch to cause a display to show a count-up in the form of an elapsed time in days since a routine task was last completed. The user can manually actuate the first switch again when the user subjectively determines that too long of an interval has elapsed, and after the task has been completed again, so that a new count-up and display of elapsed time are initiated. The user can also manually actuate a second switch to selectively show on the display data that informs the user about the length and frequency of the time intervals between multiple task completions.

20 Claims, 10 Drawing Sheets

(56) References Cited

U.S. PATENT DOCUMENTS

| | | | |
|---|---|---|---|
| 5,625,334 A | 4/1997 | Compton | |
| 5,711,160 A * | 1/1998 | Namisniak | G09F 7/04 |
| | | | 116/308 |
| 5,877,953 A * | 3/1999 | Clendenen | G06F 1/163 |
| | | | 700/17 |
| 5,999,494 A | 12/1999 | Holzrichter | |
| 6,104,674 A | 8/2000 | Emoff et al. | |
| 6,198,695 B1 | 3/2001 | Kirton et al. | |
| 6,201,768 B1 | 3/2001 | de Meyer et al. | |
| 6,392,560 B1 | 5/2002 | Stuehling et al. | |
| 6,416,216 B1 | 7/2002 | Haughey | |
| 6,483,779 B1 | 11/2002 | Teixeira | |
| 6,567,785 B2 | 5/2003 | Clendenon | |
| 6,667,936 B1 | 12/2003 | Ditzig | |
| 6,817,192 B2 * | 11/2004 | Ector, Jr | G01N 33/02 |
| | | | 206/459.1 |
| 6,839,305 B2 | 1/2005 | Perlman et al. | |
| 6,898,155 B1 | 5/2005 | Norman | |
| 6,934,220 B1 | 8/2005 | Cruitt et al. | |
| 7,020,047 B1 | 3/2006 | Brock | |
| 7,196,619 B2 | 3/2007 | Perlman et al. | |
| 7,236,428 B1 | 6/2007 | Morse | |
| 7,277,361 B1 | 10/2007 | Baba | |
| 7,289,016 B2 | 10/2007 | Luebke et al. | |
| 7,480,212 B1 | 1/2009 | DuBreuil | |
| 7,522,477 B1 | 4/2009 | Sheldon | |
| 7,532,544 B2 | 5/2009 | Morse | |
| 7,545,257 B2 | 6/2009 | Brue | |
| 7,577,522 B2 | 8/2009 | Rosenberg | |
| 7,583,972 B2 | 9/2009 | Clipsham | |
| 7,746,730 B2 | 6/2010 | Olayinka et al. | |
| 7,944,342 B2 * | 5/2011 | Sekura | G16H 20/10 |
| | | | 340/309.4 |
| 8,072,846 B2 | 12/2011 | Gordon et al. | |
| 8,077,552 B1 * | 12/2011 | Pope | G04F 3/08 |
| | | | 368/109 |
| 8,102,246 B2 | 1/2012 | Davidson, II | |
| 8,218,401 B2 | 7/2012 | Wilson et al. | |
| 8,242,922 B2 | 8/2012 | Varasteh | |
| 8,369,187 B2 | 2/2013 | Artola Godoy | |
| 8,441,893 B2 * | 5/2013 | Stephens Stauffer | G04F 10/00 |
| | | | 368/107 |
| 8,526,273 B2 | 9/2013 | Gordon et al. | |
| 8,923,096 B1 | 12/2014 | Stotz et al. | |
| 9,092,014 B2 | 7/2015 | Hill | |
| 9,195,967 B2 | 11/2015 | Smith | |
| 9,293,068 B1 * | 3/2016 | Hibbert | A44C 25/007 |
| 9,558,475 B2 | 1/2017 | Seligmann | |
| 9,660,953 B2 | 5/2017 | Smith | |
| 9,986,419 B2 | 5/2018 | Naik et al. | |
| 2002/0009018 A1 | 1/2002 | Patella | |
| 2002/0114223 A1 | 8/2002 | Perlman et al. | |
| 2002/0180591 A1 | 12/2002 | Berstling et al. | |
| 2003/0169172 A1 * | 9/2003 | Stanfield | G08B 23/00 |
| | | | 340/573.1 |
| 2005/0052954 A1 | 3/2005 | Riedi et al. | |
| 2005/0141346 A1 | 6/2005 | Rawls et al. | |
| 2005/0251289 A1 * | 11/2005 | Bonney | A61M 15/0083 |
| | | | 700/244 |
| 2006/0109750 A1 | 5/2006 | McCracken et al. | |
| 2006/0133215 A1 | 6/2006 | Gordon et al. | |
| 2006/0154642 A1 * | 7/2006 | Scannell | F21V 33/00 |
| | | | 455/404.1 |
| 2006/0181961 A1 | 8/2006 | Hobkirk | |
| 2006/0218011 A1 * | 9/2006 | Walker | A61J 7/04 |
| | | | 705/3 |
| 2006/0239125 A1 | 10/2006 | Chung et al. | |
| 2006/0256665 A1 | 11/2006 | Kadokura | |
| 2006/0259469 A1 * | 11/2006 | Chiu | G06Q 30/02 |
| 2007/0076530 A1 | 4/2007 | Robinett | |
| 2007/0086275 A1 | 4/2007 | Robinson et al. | |
| 2007/0091726 A1 | 4/2007 | Stauffer et al. | |
| 2007/0117073 A1 | 5/2007 | Walker et al. | |
| 2007/0183269 A1 | 8/2007 | Baba | |
| 2008/0256445 A1 | 10/2008 | Oleh et al. | |
| 2008/0279051 A1 | 11/2008 | Chen et al. | |
| 2009/0059729 A1 | 3/2009 | Olayinka et al. | |
| 2009/0070949 A1 * | 3/2009 | Sagel | A46B 11/0058 |
| | | | 15/28 |
| 2009/0149166 A1 | 6/2009 | Habib et al. | |
| 2009/0201773 A1 | 8/2009 | Wilson et al. | |
| 2009/0245029 A1 | 10/2009 | Kam | |
| 2009/0246083 A1 | 10/2009 | Samborn et al. | |
| 2010/0061191 A1 | 3/2010 | Chen | |
| 2010/0118659 A1 | 5/2010 | Orme | |
| 2011/0032105 A1 * | 2/2011 | Hoffman | G01S 19/19 |
| | | | 340/573.1 |
| 2011/0090765 A1 | 4/2011 | Brote | |
| 2012/0002510 A1 | 1/2012 | Berman, Jr. | |
| 2012/0088213 A1 * | 4/2012 | Soltanoff | G09B 23/28 |
| | | | 434/247 |
| 2012/0210615 A1 | 8/2012 | Coney | |
| 2013/0009774 A1 | 1/2013 | Sabeta | |
| 2013/0142017 A1 | 6/2013 | Ding | |
| 2013/0339026 A1 | 12/2013 | Lee | |
| 2014/0016442 A1 | 1/2014 | Hoover | |
| 2014/0172313 A1 | 6/2014 | Rayner | |
| 2014/0198623 A1 * | 7/2014 | Hill | G04B 47/00 |
| | | | 368/10 |
| 2014/0219065 A1 | 8/2014 | Novak | |
| 2014/0266760 A1 * | 9/2014 | Burke, Jr | G08B 21/24 |
| | | | 340/687 |
| 2014/0340999 A1 | 11/2014 | Zhang et al. | |
| 2015/0103632 A1 | 4/2015 | Takano et al. | |
| 2015/0138929 A1 * | 5/2015 | Freeman | G08B 21/0453 |
| | | | 368/107 |
| 2015/0161783 A1 * | 6/2015 | Chang | G02C 11/10 |
| | | | 382/116 |
| 2016/0034148 A1 * | 2/2016 | Wilson | G06F 1/163 |
| | | | 715/835 |
| 2016/0034152 A1 * | 2/2016 | Wilson | G06F 1/163 |
| | | | 715/835 |
| 2016/0299572 A1 | 10/2016 | Grover et al. | |
| 2017/0053512 A1 | 2/2017 | Freeman et al. | |
| 2017/0082983 A1 | 3/2017 | Katzer et al. | |
| 2017/0105190 A1 | 4/2017 | Logan et al. | |
| 2017/0249115 A1 * | 8/2017 | Yuen | G06F 40/10 |
| 2017/0357427 A1 * | 12/2017 | Wilson | G06F 3/04845 |

FOREIGN PATENT DOCUMENTS

| | | | | |
|---|---|---|---|---|
| WO | WO02071158 A1 | 9/2002 | | |
| WO | WO2005071606 A1 | 8/2005 | | |
| WO | WO2007030566 A2 | 3/2007 | | |
| WO | WO2007098540 A1 | 9/2007 | | |
| WO | WO2007138308 A2 | 12/2007 | | |
| WO | WO2013184334 A2 | 12/2013 | | |
| WO | WO-2016140669 A1 * | 9/2016 | | G08B 21/0469 |

OTHER PUBLICATIONS

ElectronicsUSA, CK-6000 Event Countdown Clock / Count Up Clock with Days, 3 page product description, Internet Archive Wayback Machine date Apr. 11, 2016.

Taylor 5853 Easy Button Digital Timer/Clock—one page—front and back of product insert—Jan. 29, 2014.

Chi-Li Yen, A location-based personal task reminder for mobile users—one page—abstract of 2014 article.

Lomas, Natasha, Droplet Is A Bluetooth Button That Makes Reminders More Sticky—three page article posted on the Internet Apr. 14, 2015.

Meet Droplet The Smart Reminder—four pages—Copyright 2015—access to videos—obtained from the Internet Apr. 26, 2017.

Taylor 5853 spec sheet—one page —obtained from the Internet on Dec. 28, 2017.

E-pll MedGlider HOME instructions—two pages—obtained from the Internet Apr. 23, 2017.

Timex Healthcare Medication Manager instructions—three pages—obtained from the Internet Apr. 14, 2017.

(56) References Cited

OTHER PUBLICATIONS

Dries, Lauren, Moti, Your Personal Cheerleader three pages—article posted on the Internet Apr. 14, 2015.
Motivaider, product description—two pages—obtained from the Internet May 6, 2017.
Rogers, Todd et al.—Reminders Through Association—fourteen page article—copyright 2016—obtained from the Internet Dec. 26, 2017.
Taylor 5849 spec sheet—one page—obtained from the Internet May 20, 2017.
Thingzo: Easily Find Out When Things Last Moved—twenty page article obtained from www.kickstarter.com May 20, 2017.
Taylor 5827-21 spec sheet—two pages—obtained from the Internet May 20, 2017.
Taylor 5849 instructions—one page—obtained from the Internet May 20, 2017.
Ravenscraft, Eric, The Best Habit Tracking App for Android—four pages—dated Feb. 1, 2017—obtained from the Internet.
Alexa Skills Store—Habit Log—three pages—Release Date Dec. 7, 2016—obtained from the Internet.
Goal Tracker by Hoogalit—four pages—Release Date Dec. 22, 2016—obtained from the Internet.
Levinson, Steve, MotivAider Basic Instructions—four pages—Copyright 2012 Behavioral Dynamics, Inc.

* cited by examiner

US 11,321,677 B1

ACTION REMINDER DEVICE AND METHOD

CROSS-REFERENCE TO RELATED APPLICATION

This non-provisional application claims priority based on provisional application Serial No. U.S. 62/503,793 filed in the United States Patent & Trademark Office on May 9, 2017 and having the same title, the entire contents of which are hereby expressly incorporated by reference. All priority claims identified in the Application Data Sheet for this non-provisional application, and any corrections thereto, are also hereby incorporated by reference under 37 CFR § 1.57.

FIELD OF THE INVENTIVE SUBJECT MATTER

The inventive subject matter disclosed herein broadly relates to electronic timers, and more specifically, to time-based electronic reminder devices and methods of using the same.

BACKGROUND OF THE INVENTIVE SUBJECT MATTER

Electronic timers are commonly used to measure time intervals. There are two basic types. One type of electronic timer measures an elapsed time by counting upwards from zero. An example of this type of electronic timer is a stop watch commonly used in athletic events which continuously displays and updates the elapsed time in seconds, and eventually, in minutes and seconds. A stop watch typically has a START/STOP push button switch and a RESET push button switch. Another type of electronic timer counts downwards to zero from a specified time interval. An example of this type of electronic timer is a kitchen timer which typically has separate push button switches for specifying the time interval and commencing the count down. The time remaining is continuously updated and displayed in minutes and seconds and an audible alarm typically sounds when the specified time interval has expired.

Dedicated electronic reminder devices typically execute methods of active notification which require the user to program a specific time of day at which the user wishes to be notified. A commonly used electronic reminder device is the conventional bedside wake-up alarm clock. With an electronic alarm clock the user must set a specific time to be notified via a sound that signals that it is time to wake up.

As is typical today with the prevalence of smartphones, the alarm clock model has now become an application program ("app") that runs on smartphones. This migration has facilitated increased complexity in the notification programming, namely, different wake-up times for different days. However, a software implemented alarm clock still adheres to the conventional methodology of delivering an active notification, namely, sound and/or light, at a pre-programmed time or at a set of pre-programmed times.

In the past a variety of electronic pill reminder devices have been commercially available in the United States ("U.S."), such as those sold under the e-Pill™ trademark. They include a digital display that shows the actual time of day. Sometimes they incorporate compartments for storing pills. Various alarms can be set with these electronic pill reminder devices to remind a person that it is time to take oral medications. These devices are intended primarily to assist elderly persons with their medication adherence, and in particular, those who live independently and suffer from mild cognitive impairment.

An example of a multipurpose consumer electronics product that can be used to provide time-based reminders is the Amazon Echo™ information device. Upon voice command, it can generate audible tones and illumination to alert the user at the end of a requested timing period. Similarly, the Google Home™ voice-actuated information device allows the user to execute a variety of timer commands, such as "OK Google, how much time is left on my pizza?" Some fitness trackers, such as the Fitbit® wrist-worn device, are capable of generating vibrating reminders to prod the wearer to physically move. They can also track daily goals for being active each hour.

Numerous software programs that run on personal computers ("PCs") and tablets, and apps that run on smartphones, have been developed and commercialized in the U.S. for calendaring personal activities that need attention. They automatically send pre-programmed reminders to their users. By way of example, reminder apps that run on Android® smartphones are commercially available under the following trademarks: RemindMe, Any.Do, and Wunderlist. Exemplary reminder apps that run on iPhone® smartphones are commercially available under the following trademarks: Things 3, Due, and Checkmark 2.

For many years law firms have utilized elaborate computerized docketing systems to calendar critical filing deadlines. Other electronic reminder systems that have been commercialized involve the use of an interactive device such as a radio frequency ("RF") pager that communicates with a central hub and delivers pre-programmed daily wake-up alarms and un-read message reminders to the user.

Various electronic reminder devices are disclosed in issued U.S. patents and published U.S. patent applications. See, for example, U.S. Pat. No. 6,817,192 B2 of Ector, Jr. et al., U.S. Pat. No. 6,839,305 B2 of Perlman et al., U.S. Pat. No. 7,020,047 B1 of Brock, U.S. Pat. No. 7,532,544 B2 of Morse, U.S. Pat. No. 8,441,893 B2 of Stauffer et al., U.S. Patent Application No. 2006/0109750 A1 of McCracken et al., U.S. Patent Application No. 2006/0181961 A1 of Hobkirk, U.S. Patent Application No. 2011/0090765 A1 of Brote, U.S. Patent Application No. 2013/0339026 of Lee, and U.S. Patent Application No. 2014/0016442 A1 of Hoover.

Various electronic reminder devices are also disclosed in foreign patent literature. See, for example, WO 02/071158 A1 of Ditzig, EP 1 441 300 A1 of Avaya Technology Corp., WO 2005/071606 A1 of Kam, WO 2007/030566 A2 of Martin, WO 2007/098540 A1 of RESMED LTD, WO 2007/138308 A2 of TRADE TRUE LIMITED, EP 2 665 023 A1 of BlackBerry Limited, and WO 2013/184334 A2 of APPLE INC.

A number of concepts for consumer electronics products for assisting users in improving their personal habits have been proposed on crowdfunding web sites.

Although various electronic reminder devices and methods are known in the art, they all suffer from one, or more than one, disadvantage. Therefore, improvements to existing electronic reminder devices and methods are needed.

BRIEF SUMMARY OF THE INVENTIVE SUBJECT MATTER

In accordance with one aspect of the inventive subject matter disclosed herein, a standalone electronic passive reminder device includes a display for showing a count-up to a user in days and a mechanism for receiving commands from the user. Circuitry connected to the display and the receiving mechanism executes an operation program that initiates the count-up that is shown on the display when a first command from the user is received. The count-up represents an elapsed time since an assigned action was last completed. The circuitry and operation program enable the user to give the first command again when the user subjectively determines that a sufficient amount of time has elapsed, and after the assigned action has been completed again, so that a new count-up is initiated and shown on the display. The circuitry and the operation program are configured so that receipt of a second command from the user causes the display to show a form of data that enables the user to monitor the user's progress toward a goal of completing the assigned action with a desired frequency.

In one embodiment the reminder device uses a pair of manually actuated switches for receiving user commands. In another embodiment the reminder device has a lone manually actuated switch which can be manipulated in different manners to signal action completion and selections from a menu. In still another embodiment the reminder device includes a motion sensor for receiving a user command. In another embodiment the reminder device does not include any manually actuable switches but instead can execute the functions taught herein upon receipt and recognition of a specific voice command or commands enunciated by the user. In yet another embodiment the reminder device receives user commands from a remote control. In some embodiments the reminder device can include circuitry and programming for wirelessly transferring data to servers, web sites, and/or external computing devices. In other embodiments the reminder device can include a data transfer port for downloading data to an external computing device. The data stored in the reminder device can consist of logged data and/or analytics. In some embodiments the reminder device can provide visual reward messages upon task completion. In still other embodiments the reminder device can provide audible reward messages in addition to, or in lieu of, visible reward messages. In still further embodiments the reminder device can provide progress reports.

In accordance with another aspect of the inventive subject matter disclosed herein a method of using passive reminders to facilitate completion of a routine task with a desired frequency includes the steps of: 1) providing a standalone electronic display; 2) assigning a routine task to the display; 3) completing the task; 4) commencing a count-up on the display showing the elapsed time in days since the task was last completed; 5) periodically observing the display to learn the current elapsed time; 6) subjectively determining if the current elapsed time has been too long; 7) completing the task again when the subjective determination has been made; and 8) initiating a new count-up on the display.

In one embodiment of the method, the display is placed at a location that a user associates with the routine task. In another embodiment the reminder method includes the additional steps of: 9) selectively observing data on the display representative of intervals between a plurality of successive completions of the task; and 10) adjusting the user's actual frequency of task completion based on the displayed data so that the actual frequency more closely approximates the desired frequency. Still another embodiment of the method includes the step of selectively transferring the data to an external computing device. In another embodiment the method, completion of a task is accompanied by manual action of a switch to indicate the completion and to commence the count-up on the display showing the elapsed time.

In still another embodiment of the method the step of selectively showing on the display data representative of intervals between a plurality of successive completions of the task is accomplished by manual actuation of a switch. In some embodiments of the method, the data representative of intervals between a plurality of successive completions of the task is selected from the group consisting of the elapsed time since the last action completion, a statistical measure of the time between action completions, and the historical action completion in graphic form. In yet another embodiment, the method of the inventive subject matter includes the additional step of providing a reward message upon completion of the task.

Various objects, features, and advantages of the inventive subject matter disclosed herein will become more apparent from the following detailed description of different embodiments, and modifications thereof, and from the accompanying drawing figures.

BRIEF DESCRIPTION OF THE DRAWING FIGURES

In the course of the detailed description that follows, reference will be made to the accompanying drawings figures forming part of the present application. These drawing figures illustrate various aspects of the inventive subject matter disclosed herein. Where applicable, like reference numerals in different drawing figures indicate the same structures, components, materials, and/or elements. The drawing figures are not necessarily drawn to scale.

Figure 1:
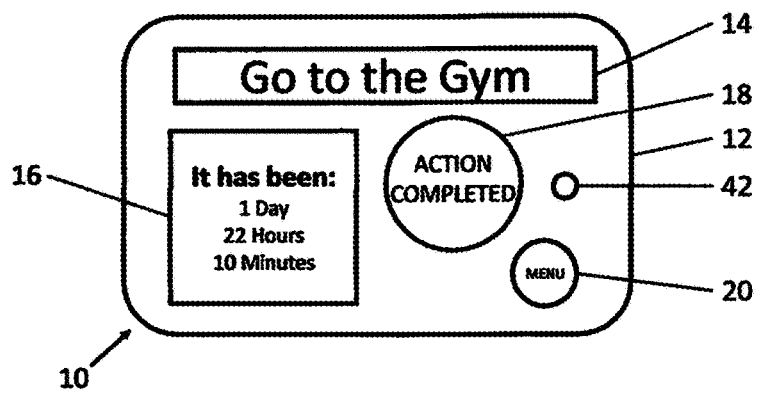
FIG. 1 is a plan view of the front of a standalone electronic reminder device in accordance with a first embodiment of the reminder device of the inventive subject matter disclosed herein.

It should be understood that various combinations of the structures, components, elements, and/or steps, other than those specifically illustrated in the drawing figures, are contemplated and are within the scope of the inventive subject matter as defined by the numbered claims at the end of this application.

DETAILED DESCRIPTION

The Problem Solved

The inventive subject matter disclosed herein solves the multifaceted problem of the inconvenience, inflexibility, and ineffectiveness of prior electronic reminder devices and methods as explained hereafter. Previously this problem has not been recognized in the art and therefore a solution has not been forthcoming until the subject matter of the present invention was conceived and reduced to practice by the joint inventors named in this application.

Many routine chores and tasks, such as feeding tropical fish in an in-home aquarium, give no visible indication that they need to be done. Other actions such as exercising at a gym should be done regularly, but persons often forget how long it has been since their last visit. The many demands of everyday life make it difficult to remember when chores and activities were last completed and when they need to be completed again.

A person's perception of the amount of time that has elapsed since the last completion of a routine task can vary significantly from the actual elapsed time, depending on whether the person has a busy life style, as well as factors such as the person's age, the person's emotional state, and the person's physical state. Therefore, without some type of accurate reminder system, a person can easily misjudge how long it has been since a routine task was last completed. Over time a person can also misjudge the average interval between his or her successive completions of a routine task. For example, a person can mistakenly believe that he or she is exercising at a gym more frequently than is actually the case.

Handwritten lists and sticky notes are cumbersome to prepare, frequently misplaced, and often inadequate as reminders. Both conventional and software implemented alarm clocks only provide active reminders. As used herein, the term "active reminders" refers to reminders that are automatically sent at predetermined times as discrete messages or other individual notifications by an alarm clock, a dedicated timer device, or a calendaring software tool that runs on a PC or a tablet, or a calendaring app that runs on a smartphone.

Commercially available standalone electronic timers, such as kitchen timers, typically cannot display time on a scale of multiple hours, let alone multiple days. This shortcoming of kitchen timers prevents people from using them to remind them that a routine task should be completed. In addition, conventional kitchen timers usually count down from a pre-programmed number of minutes and have no capability for indicating when a routine task was last completed.

Many routine tasks, such as watering a garden, do not need reminders to be sent at fixed times as their completion schedules are flexible. Existing reminder devices and software do not adequately take into account the environment in which a reminder notification will be received. Therefore, prior calendaring systems generate active reminders which the user will likely ignore when the notification is provided at a time or place when, as a practical matter, the user cannot complete the action about which he or she is being reminded. Calendaring programs and apps typically give reminders that are not location specific. As such they can give reminders that are not relevant to the user's current location. For example, it is useless and annoying, to inform a user sitting in a conference room at work that he or she needs to water the vegetable garden at that person's residence. Even reminder systems that use global positioning system ("GPS") location data are not sensitive enough to determine, for instance, which room in a home the user is presently occupying. Reminder systems that run on smartphones sometimes send reminders based on location. For example, the iPhone reminder software can tell a person to pick up their dry cleaning when they are within 600 feet of the dry cleaner. But whether the user's location is determined via GPS or via less accurate triangulation with cell phone towers, such devices and software cannot determine where a person is situated within a residence, let alone what direction they are facing.

Calendaring software tools and apps are tedious and time consuming to program. Those that run on smartphones generate reminders in a crowded and cluttered "connected" environment where the user is constantly being bombarded with a flow of emails, text messages, and notifications from other apps such as the WhatsApp® instant messaging system. The typical smartphone user also continually receives alerts sent by the many other apps running on the same smartphone such as Facebook® and the NFL Mobil™ app. This reduces the effectiveness of reminders sent by calendaring apps because they are buried in a mass of daily notifications and therefore are not conspicuous. In addition, existing calendaring systems that provide reminders are ineffective in improving habits because they do not include any tracking ability regarding the history of successive, i.e. multiple completions of the routine task about which reminders have been communicated.

Overview of the Inventive Subject Matter

The inventive subject matter disclosed herein overcomes the shortcomings of prior known electronic reminder devices and calendaring software. Our inventive subject matter provides a user friendly electronic reminder device and a method of using passive reminders that help the user improve a person's frequency of completion of a routine task. The reminder device of our inventive subject matter allows a user to complete a routine task or a repeated action and track how much time has elapsed since the task was last completed. Our standalone electronic reminder device provides passive reminders. As used herein, the term "passive reminders" refers to reminders that are subjectively surmised by the recipient and are not automatically generated by PCs, tablets and smartphones, and which are not sent as discrete messages at pre-programmed specific times.

In the embodiments described and illustrated herein, the reminder device includes a display to indicate the elapsed time, such as the number of days, since the user last completed a specific task. The reminder device generates passive reminders as a result of the user periodically viewing the device while in its vicinity. The user thus becomes aware of the amount of time that has elapsed since the last completion of the specific action. If the user judges the elapsed time has been "too long," indicating that the tracked action has been neglected, the user is more motivated to complete the task than if the user had not been prompted by the passive reminders. The ever increasing elapsed time provides ever increasing motivation to accomplish the routine task.

The reminder device of the inventive subject matter does not rely on active reminders, notifications, or alarms that would instruct the user to do the action at a specific time. It is preferred that the user place the reminder device at the location where he or she normally begins or completes the action being tracked. For example, it can be located next to an in-home aquarium to remind the user to feed tropical fish living in the tank. This reminder device can also be located next to items that serve as a visible cue in the user's mind that he or she needs to complete a particular routine task that takes place outside the home. For example, it can be placed near athletic shoes stored on a shelf to remind the user to visit the gym in order to exercise. As such, whenever the user views the reminder device he or she also views an item that triggers recognition of an action to be accomplished outside the home. By its very nature described above, the reminder device of the inventive subject matter functions as a repeated, but time varying, and therefore less annoying, visual cue in an appropriate location. This visual cue prompts completion of a specific action at an unspecified but appropriate time when the user has the time available to perform the action.

The standalone reminder device of the inventive subject matter can be used in a variety of settings and in conjunction with a wide range of actions. For example, an embodiment of the device can be used in the home to track household chores (e.g., washing dishes, mopping the floor, cleaning the house, changing a water filter), personal care (e.g. flossing, taking medication, calling loved ones), fitness (e.g. exercising, healthy eating), or other maintenance activities (e.g. fertilizing the lawn, watering plants, taking out the trash). Similarly, various embodiments of the reminder device of the inventive subject matter can be used in a business setting to track such things as restocking, janitorial duties, security walk-throughs, and calling potential new customers.

The reminder device of the inventive subject matter is best applied to actions that recur on a timescale of days or weeks, although it can also be applied to activities that should occur on faster or slower time scales. It is intended that the user continue to use an embodiment of the reminder device in connection with a specific or dedicated task indefinitely or until a habit has developed that results in timely, consistent, and frequent completion of the task without the aid of the reminder device as a cue.

An advantageous, yet optional, feature of an embodiment of the inventive subject matter is its ability to provide an immediate reward to the user upon completion of the task. The reward can be an encouraging text message shown on its display with or without accompanying animation. It can also be an audible reward in the form of a pleasing sound or a string of musical notes. To maintain user interest the rewards can be varied, randomized, or even made unique upon each task completion. The reminder device of the inventive subject matter takes advantage of a psychological feedback loop that cycles from <CUE> to <ACCOMPLISH ROUTINE> to <REWARD>, and back again. This psychological feedback loop facilitates the development of consistent habits.

In addition, in some embodiments the standalone reminder device of the inventive subject matter incorporates the ability to store and display logged data and analytics representative of intervals between a plurality of successive completions of an assigned task. This novel feature provides the user at the location of the task, or its visible cue, with valuable information about the length and frequency of the time intervals between each task completion. This information helps the user develop better habits in terms of completion of the assigned task with a desired optimum frequency. For example, if the user determines that she is only telephoning her mother on average every eight days, the user can resolve to call her mother more frequently. The disclosed embodiments of the reminder device allow the user to quickly and easily monitor her progress toward her goal of calling her mother more often, e.g. every four days.

The logged data can be used to calculate analytics that are displayed in various forms that enable the user to readily monitor the user's progress toward a goal of completing the task with a desired frequency. Furthermore, some embodiments of the reminder device of the inventive subject matter allow for logged data and/or analytics to be transferred to an external computing device. This allows the logged data and/or analytics to be further processed and displayed in more sophisticated and informative formats. Some embodiments also allow for logged data and/or analytics to be transmitted to servers and web sites, such as social media web sites. A plurality of such reminder devices can each pre-programmed with a unique identity code can be used to simultaneously track a user's history of completion of different routine tasks within the same household. For example one reminder device could be assigned to the piano to remind the user to practice the piano. Another reminder device in the same household could be assigned to a drinking water filter to remind the user to change the filter.

Before our inventive subject matter is described in further detail, it should be understood that it is not limited to the particular embodiments and modifications specifically described and illustrated, as they can vary in many ways. It should also to be understood that the terminology used herein is for the purpose of describing particular embodiments only, and is not intended to be limiting. The scope of protection afforded our inventive subject matter shall only be limited in accordance with the scope of our claims and not by the specific embodiments described and illustrated herein.

The First Embodiment of the Reminder Device

FIG. 1 illustrates a first embodiment 10 of the reminder device of the inventive subject matter. The reminder device 10 includes a generally rectangular outer housing 12 having a hollow interior that encloses a rectangular printed circuit board (not illustrated). The housing 12 is relatively small, e.g. 11.5 cm×7 cm×1.5 cm. The small size of the housing 12 is appropriate for allowing the reminder device 10 to be conveniently situated in many locations that remind the user of specific tasks and activities. For example, the reminder device 10 can be placed next to a framed picture of a woman's mother that sits on a dresser to remind the woman to call her mother. The housing 12 is made of injection molded thermoplastic material conventionally used to fabricate the outer cases of consumer electronic devices. One suitable thermoplastic material is acrylonitrile butadiene styrene ("ABS"). Another suitable thermoplastic material is polystyrene. The housing 12 has curved corners to provide an aesthetically pleasing appearance.

An Action identifier in the form of a pre-printed peel-and-stick label 14 (FIG. 1) is affixed to a front face of the housing 12 near its upper edge. The action identifier 14 consists of a few words that indicate the specific Action to which the reminder device 10 has been assigned. In the particular example illustrated in FIG. 1, the "assigned Action" is <GO TO THE GYM>. The label can be easily produced with a Dymo® label maker or removed from a page of adhesive labels pre-printed with standard assigned Actions and supplied with the reminder device 10 when purchased.

Referring still to FIG. 1, the reminder device 10 further includes a liquid crystal display ("LCD") 16 that is mounted in the housing 12. The display 16 is visible through a square opening formed in the front face housing 12. The display 16 is conventional in construction and is capable of displaying several lines of alphanumeric characters as well as graphics and animations. The display 16 can be the type that has a backlit screen in order to enhance viewing in low light conditions. The reminder device 10 further includes manually actuable switch means in the form of a pair of round push button switches 18 and 20 that are mounted in suitably sized circular holes formed in the front face of the housing 12. The push button switch 18 is depressed by the user a single time to simultaneously signify completion of a task and to initiate a new count-up on the display 16. This re-sets the elapsed time to zero and a new elapsed time begins to run. The push button switch 20 is a menu selection button whose functions are described hereafter. The push button switches 18 and 20 have different sized pressure pads. ACTION COMPLETED and MENU indicia are applied to the pressure pads or molded into the same. The size disparity and the indicia readily distinguish the different functions of the two push button switches 18 and 20 to the user.

The reminder device 10 is a standalone device. By "standalone" it is meant that the reminder device 10 is a self-contained unit capable of operating without external hardware or software, and without any external input other than user manipulation of its two push button switches 18 and 20. The standalone device 10 does not need any input, data, programming, or commands from a pager hub, cell phone connection, or Internet connection in order to be fully functional. It does not need to be programmed with a PC, smartphone, tablet or other external computing device in order to perform the method described hereafter. The reminder device 10 thus avoids the complicated user programming that makes reminder apps inconvenient to set up and challenging to use. As used herein, the term "external computing device" includes, but is not limited to, a PC, server, smartphone, tablet, wrist-wearable computer, fitness tracker, and smartwatch.

Attachment means (not illustrated in FIG. 1) are connected to the housing 12 and utilized for releasably securing the reminder device 10 to a mounting surface, such as the door of a refrigerator. The first embodiment of the reminder device 10 utilizes a single peel-and-stick adhesive strip (not illustrated) that is affixed to a rear face of the housing 12. Other conventional means for releasably or permanently mounting small items to a hard surface such as a wall, or to a soft item such as a laundry bag, can be used with the reminder device 10. Such means include, but are not limited to, a magnetic strip, a bracket with screw holes, a suction cup, mating Velcro® strips, a hook, a ring, a spring biased clip, a pair of molded plastic two-part connectors, and a lanyard.

Figure 2:
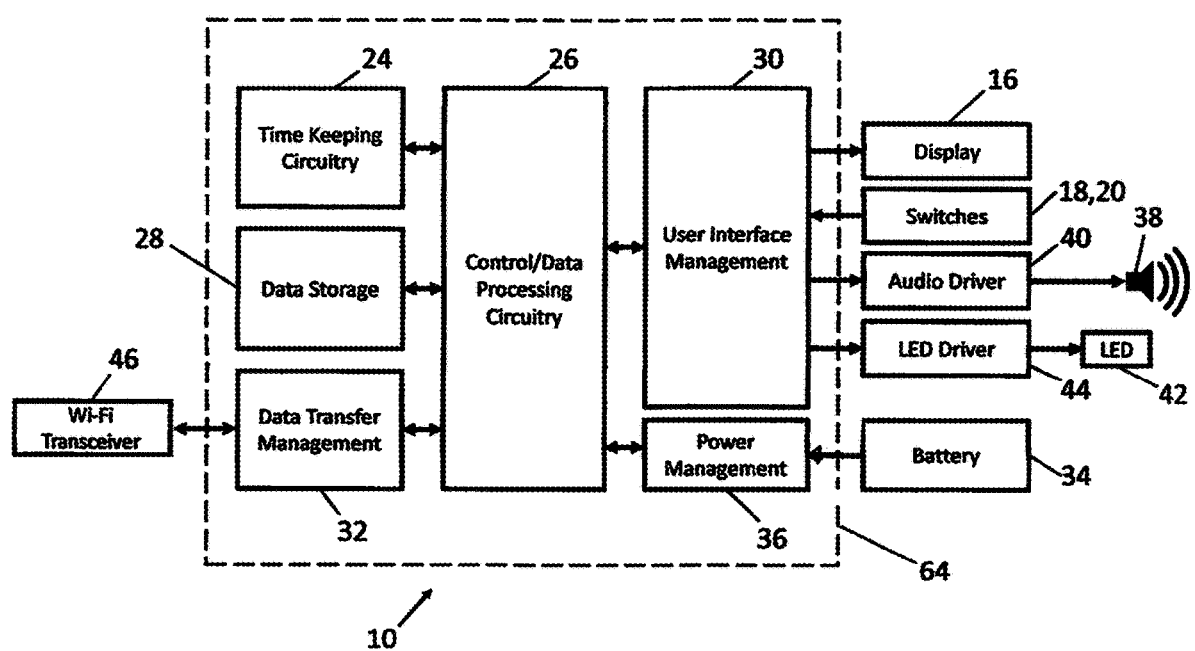
FIG. 2 is a functional block diagram illustrating the circuitry of the reminder device of FIG. 1.

Referring to FIG. 2, the reminder device 10 includes circuitry in the form of electronic components mounted and operatively interconnected on the printed circuit board inside the housing 12 and operatively connected to the push button switches 18 and 20. This circuitry includes time keeping circuitry 24, control and data processing circuitry 26, data storage 28, user interface management circuitry 30, and data transfer management circuitry 32. The control and data processing circuitry 26 includes volatile memory, such as random-access memory ("RAM"), for performing control and data processing functions. By way of example, the RAM can be the embedded RAM of a microcontroller. The data storage 28 includes non-volatile memory, such as flash memory, NVRAM or EPROM, for storing an operation program as well as logged data and analytics regarding action completions. The operation program of the first embodiment is thus firmware that is executed by the control and data processing circuitry 26 which enables the reminder device 10 to perform the unique functions described herein.

In accordance with the operation program, the control and data processing circuitry 26 interprets a first single manual actuation of the ACTION COMPLETED push button switch 18 as a command to start timing and to provide passive reminders to the user of an action that needs to be taken. These passive reminders comprise the ever-increasing elapsed time that is periodically observed by the user as he or she passes by the reminder device 10 and glances at its display 16. The first depression of the push button switch 18 causes an elapsed time or count-up to be continuously displayed and continuously updated on the display 16 starting from zero. The control and data processing circuitry 26 interprets a succeeding single manual actuation of the push button switch 18 as a command indicating that the action to be taken has been completed. This automatically resets the count-up to zero. At the same time the display 16 shows a "Good job!" reward message in text form (not illustrated) with an animated stick figure (not illustrated). This reward message is shown for a predetermined period of time, for example, ten seconds. Thereafter the new count-up is automatically displayed.

In further accordance with the operation program, the control and data processing circuitry 26 interprets the pressing of the push button switch 20 as a command to enter a menu mode of operation. Thus, the push button switch 20 carries the MENU identifier as illustrated in FIG. 1. Selectively depressing the push button switch 20 allows the user to navigate through a menu of options where the user can select from: a) view data; b) optionally configure the device; and c) trigger data transfer. The reminder device 10 doesn't just allow the user to view logged data; it performs analysis on the data and selectively displays the resulting analytics. The MENU push button switch 20 can be successively depressed to display different types of logged data on the display 16 in lieu of the current running elapsed time. Logged data includes the elapsed time of the last action completion, a statistical measure of the time between action completions, and historical action completion in graphic form. By way of example, the statistical measure can be the arithmetic mean, the standard deviation, or a measure of the shape of the distribution such as such as skewness.

In accordance with the operation program, analytics are calculated by the control and data processing circuitry 26 and selectively provided to the user via manual actuation of the MENU push button switch 20. These analytics can include the average and median times between completions of the assigned Action, days of the week in which the user completed the assigned Action the most frequently, and the manner in which such statistics vary over time. As used herein, the term "data representative of intervals between a plurality of successive completions of the task" includes, but is not limited to, various individual forms of logged data and analytics, and combinations thereof.

The user is thus selectively provided with valuable information about the length and frequency of the time intervals between each task completion. This allows the user to determine if good habits are being formed in regard to an assigned Action, such as reading stories to his or her children on a regular basis. Thus, the data stored in the data storage 28 is of a form that advantageously enables a user to monitor the user's progress toward a goal of completing the assigned task with a desired frequency.

After proceeding through all of the menus, the next manual actuation of the MENU push button switch 20 causes the control and data processing circuitry 26 to once again indicate the current running elapsed time on the display 16. This elapsed time is "current" in that it continues to be incremented, whether or not shown on the display 16, until the ACTION COMPLETED push button switch 18 is depressed again.

A power source in the form of a battery 34 (FIG. 2) is connected to the control and data processing circuitry 26 through power management circuitry 36. The latter circuitry includes a voltage regulator. In the first embodiment of the reminder device 10 the battery 34 is a LiPo battery that is built into the device and is not intended to be removed. It is rechargeable through a female jack (not illustrated) accessible on one end of the housing 12. A conventional AC/DC power converter (not illustrated) can be temporarily connected to the reminder device through its mating male plug. A LiPo battery has the advantage of being re-chargeable and having a relatively long life. It can run the reminder device 10 for an extended period of time before it needs re-charging. It can also go through many charge/discharge cycles before it ceases to operate satisfactorily. Various LiPo batteries that are suitable for use in the first embodiment of the reminder device 10 are commercially available.

A small audio speaker 38 (FIG. 2) is mounted inside the housing 12 behind a louvered opening (not illustrated) formed in the rear face of the housing 12. The audio speaker 38 can be of the miniature type used in smartphones. The audio speaker 38 is connected to an audio driver circuit 40 which is connected to the control and data processing circuitry 26 through the user interface management circuitry 30. In accordance with the operation program, each time the ACTION COMPLETED push button switch 18 is pressed, the control and data processing circuitry 26 causes the audio speaker 38 to emit reward sounds. Non-verbal reward sounds are preferably delivered to the user, like "happy" beeps. Other soothing audible rewards that can be delivered include chirping, purring and other simulated animal sounds. In accordance with the operation program, the control and data processing circuitry 26 also causes the audio speaker 38 to emit a pre-programmed audible sound, such as a beep, each time the MENU push button switch 20 is manually actuated, to provide user feedback in response to the pressing of that MENU switch.

A yellow LED 42 (FIGS. 1 and 2) is mounted in a small hole formed in the front face of the housing 12. An LED driver circuit 44 (FIG. 2) energizes the yellow LED 42 and is connected to the control and data processing circuitry 26 through the user interface management circuitry 30. In accordance with the operation program, the yellow LED 42 is selectively energized by the control and data processing circuitry 26 to provide a low battery power warning signal. This notifies the user that it is time to re-charge the battery 34. This feature helps prevent the situation where the reminder device 10 runs out of electrical power and can no longer maintain and display a count-up of the elapsed time. The power management circuitry 36 is responsible for sensing and tracking the power level of the battery 34. The control and data processing circuitry 26 causes the yellow LED 42 to be energized when the power management circuitry 36 detects that the level of stored energy remaining in the battery 34 is below a predetermined minimum threshold level, e.g. fifteen percent of capacity. The yellow LED 42 is energized in accordance with a pre-programmed duty cycle, e.g. ON for one-tenth of a second and OFF for the remainder of each five second interval of time. The intermittent flashing of the yellow LED 42 provides a more eye-catching warning signal and also consumes less power than if it were continuously illuminated.

The reminder device 10 incorporates a Wi-Fi transceiver 46 (FIG. 2) that provides a wireless communications link 48 (FIG. 3) to a conventional combination Internet modem and Wi-Fi router 50. The Wi-Fi transceiver 46 is operatively connected to the control and data processing circuitry 26 (FIG. 2) through the data transfer management circuitry 32. The wireless communications link 48 (FIG. 3) executes a Wi-Fi digital communications protocol based on the IEEE 802.11 standards.

Figure 3:
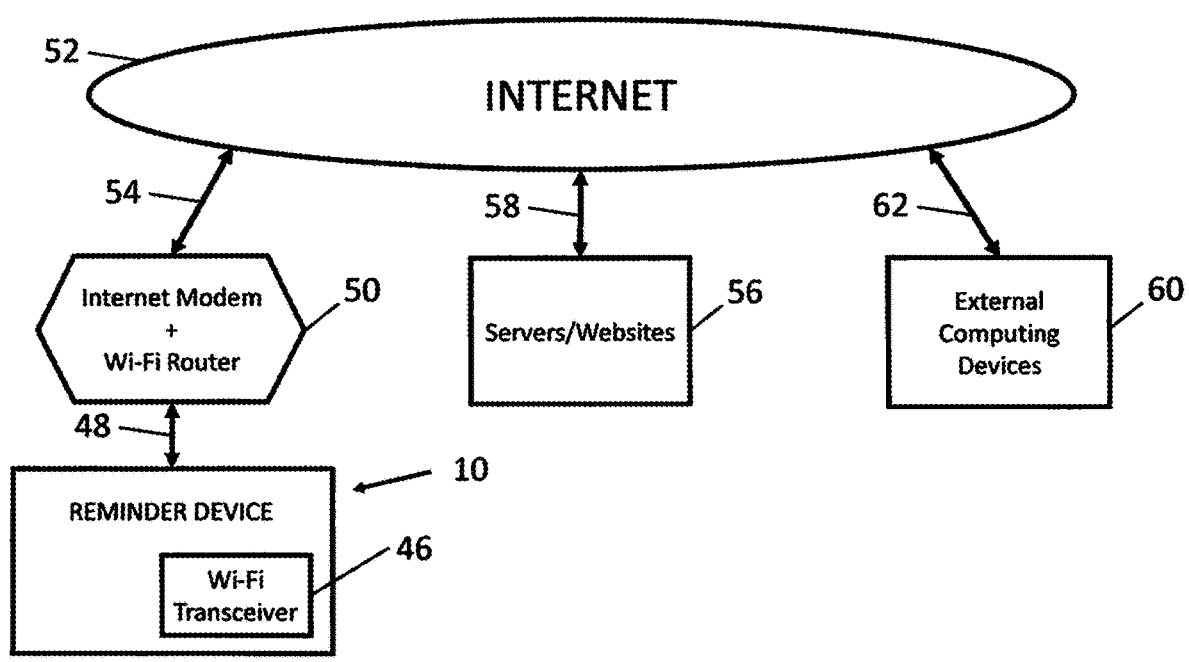
FIG. 3 is a diagrammatic illustration of the reminder device of FIG. 1 communicating through the Internet with servers, websites, and external computing devices.

The components and arrangements illustrated in FIG. 3, except for the reminder device 10, represent the architecture of the present-day Internet 52 and the conventional peripheral devices that communicate with the Internet over existing communications links provided by cable companies, cell phone companies, satellite data communications companies, etc. The technical details of the Internet, the peripheral devices, and the communications links are well understood by persons skilled in the relevant art and need not be described herein.

The combination Internet modem and Wi-Fi router 50 communicates with the Internet 52 via an Internet connection 54. Various conventional servers and websites 56 can be accessed through the Internet 52 via established communications links 58. The Wi-Fi transceiver 46 is configured and operatively connected to the control and data processing circuitry 26 to enable logged data and/or analytics stored in the data storage 28 of the reminder device 10 to be transmitted via the Wi-Fi transceiver 46 through the Internet 52 to servers and websites 56 via the communications links 58. The Wi-Fi transceiver 46 also enables logged data and/or analytics to be transferred to conventional external computing devices 60 via established communications links 62.

The reminder device 10 can use the illustrated architecture of the Internet to communicate with a server such as that of the If-This-Then-That ("IFTTT") web site or similar service provider. By connecting to the IFTTT web site, the reminder device 10 is capable of triggering more complex communications to other Internet connected computing devices and services. For example, when the user pushes the ACTION COMPLETED push button switch 18 (FIG. 1) after completing the action of going to the gym for the one hundredth time, the device can communicate this information to the IFTTT web site. That web site can then process the information, automatically post a message to the user's Facebook® profile, and also send a text message about this milestone to his or her gym partner's smartphone.

The communications architecture illustrated in FIG. 3 permits logged data and/or analytics stored in the data storage 28 of the reminder device 10 to be transferred to a spreadsheet on one or more of the external computing devices 60. Thus, this logging platform allows the reminder device 10 to use the Internet to transfer logged data and/or analytics to a PC, tablet, smartphone or other external computing device 60. By way of example, a user can be shown sophisticated colored charts and graphs on these devices that illustrate the user's performance of a particular task over successive months. Updates and other changes to the operation program of the reminder device 10 can be uploaded into the data storage 28 via the Wi-Fi transceiver 46.

The data storage 28 of each reminder device 10 is pre-programmed with a unique identity code. This allows a plurality of reminder devices to be spread throughout the home and simultaneously monitored. The assigned tasks and locations of several different reminder devices spread throughout the same home can be separately displayed on an external computing device 60 along with the logged data and/or analytics pertaining to the same.

The capability of the reminder device 10 to upload data from the device to social media platforms can be beneficial in terms of motivating a user to improve his or her habits regarding personal routines. For example, the reminder device 10 can upload achievement awards to a user's social media accounts, thereby garnering recognition and praise from the user's friends. In accordance with the operation program, the control and data processing circuitry 26 can generate achievement awards for each successive ten percent reduction in the length of the interval between a plurality of successive completions of an assigned Action. Achievement awards can be shown on the display 16, transferred to an external computing device 60, and then automatically uploaded to the user's Facebook® profile and Twitter® account.

Thus to recapitulate, logged data and analytics can be selectively viewed in different useful forms on the display 16 of the reminder device 10. The logged data and analytics can also be transferred over the Internet to a remote computing device for more sophisticated analysis and display. The user can be provided with valuable metrics that indicate how well he or she is doing over an extended duration, e.g. several months, in terms of performing routine tasks at a desired pace.

Progress reports can be automatically generated on a regular periodic basis and sent to a remote computing device. For example, each month the reminder device 10 can automatically upload logged data and analytics to a remote server 56 via the Wi-Fi transceiver 46. The server 56 can formulate a progress report and transmit the same to an external computing device 60 to inform the user of her or his average time between completions of the assigned Action during the previous month. The progress report can also inform the user of the historic average time between completions of the assigned Action. The progress report can be shown in sophisticated formats in terms of content, color and graphics. In one embodiment of the inventive subject matter, a progress report can be sent each month to a user's smartphone. Less sophisticated progress reports can also be locally generated by the control and data processing circuitry 26. The most recent such progress report can be shown on the display 16 for a predetermined amount of time, e.g. twenty seconds, each time the push button switch 18 is manually actuated and before the current elapsed time is shown.

Thus the first embodiment of our reminder device provides a combination of beneficial capabilities lacking in prior art reminder devices, namely: a) passively reminding the user; b) rewarding the user; and c) informing the user of past performance. This novel combination of capabilities helps users build positive habits in terms of regular accomplishment of an assigned task within a desired time frame.

The novel combination of functions and features in the reminder device 10 allows for convenient tracking and enhancing personal performance regarding timely completion of routine tasks. The reminders employed are passive and are more effective as they are sent outside of the PC, tablet, and smartphone universe and in a location associated with the task. The passive reminders are continuous, are not intermittent, and are constantly being updated in real time. The reminder device 10 does not generate or send active reminders that would have a high probability of being ignored by the recipient. In using the reminder device 10 the timing of task completion is based on the subjective determination of the user. Attractive and stimulating visible and audible rewards can be given to the user upon each task completion. The user is selectively provided with valuable feedback in the form of logged data and analytics representative of intervals between completions of the task.

By way of example, the reminder device 10 can include the following electronic components for use in implementing the circuitry and functions described above: crystal oscillators, DRAM, SRAM, transistor logic, flash memory, microprocessors, microcontrollers, field programmable gate arrays ("FPGAs"), Wi-Fi-chips and/or Bluetooth chips. The reminder device 10 can include application specific integrated circuits ("ASICs") in addition to, or as the sole implementation of, the circuitry, operation program and functions so far described. As used herein the term "operation program" includes software, firmware, dedicated logic implemented via an ASIC or other integrated circuit, and various combinations of the foregoing. The display 16 that shows the elapsed time can be implemented with a variety of technologies including, but not limited to, color LCDs, segment displays, LCD segment displays, e-paper displays, LEDs, OLEDs, and analog display devices.

By way of further example, the functional blocks illustrated in FIG. 2 can be implemented with commercially available parts as follows. The functions of the blocks surrounded by the dashed line rectangle 64 in FIG. 2 can be carried out by a microcontroller, namely, Part No. ATmega328P, manufactured by Microchip Technology Inc. This part is a low-power CMOS 8-bit microcontroller that utilizes a reduced instruction set computer ("RISC") architecture. It includes 32 K bytes of in-system self-programmable flash program memory, 1 K byte of electrically erasable programmable read-only memory ("EEPROM"), and 2 K bytes of internal static random-access memory ("SRAM"). The display 16 can be Part No. NOKIA5110/3310 Monochrome LCD sold by Adafruit Industries LLC. The push button switches 18 and 20 can be Part No. KS-0IQ-01 manufactured by E-Switch, Inc. The audio driver 40 can be Part No. IRS20957STRPBFTR manufactured by Infineon Technologies. The LED driver 44 can be Part No. AL5802-7 manufactured by Diodes Incorporated. The Wi-Fi transceiver 46 can be Part No. CC3100R11MRGCR manufactured by Texas Instruments Incorporated and sold under the SimpleLink™ brand. This so-called "RF system on a chip" has an operating frequency of 2.4 GHz and a maximum data rate of 16 Mbps. It includes an on-chip integrated antenna.

The ATmega328P microcontroller can carry out the functions described herein by executing the operation program stored in its memory. It is common to program microcontrollers in higher level programming languages such as the C++ language and the Java® language. Typically, a microcontroller is programmed using a standard integrated development environment ("IDE"). The IDE includes code editors, compilers, and debuggers, as well as other features. A full suite of program and system development tools are available for the ATmega328P microcontroller including: C compilers, macro-assemblers, program debugger/simulators, in-circuit emulators, and evaluation kits. Persons skilled in the art of electrical engineering or computer science are capable of creating the operation program of the reminder device 10 utilizing these tools based on the teachings of its novel structure, combination of features, and functionality which are set forth for the first time in our previously referenced provisional patent application. Accordingly, it is not necessary to include detailed flow diagrams in the drawing figures of this application in order to enable a person skilled in the relevant art to make and use the reminder device 10 based on the teachings of this application. In addition, no "computer program listing" as defined in 37 CFR § 1.96 need be submitted as part of this application in order to enable a person skilled in the relevant art to make and use the reminder device 10 based on the teachings of this application.

Preferably the reminder device 10 uses alternative electronic components as follows. The microcontroller 64 and the Wi-Fi transceiver 46 can be provided in a single package in the form of Part No. CC3220 commercially available from Texas Instruments. The display 16 can be an E-paper display in the form of Part No. E2271BS021 commercially available from Pervasive Displays. Sometimes such displays are also referred to as "E-ink" or "EPD." The data storage 28 can be a flash memory in the form of Part No. MX25R3235F commercially available from Macronix. The power management circuitry 36 can include a discrete voltage regulator in the form of Part No. TPS62162 commercially available from Texas Instruments.

Methods of Using Passive Reminders

Figure 4:
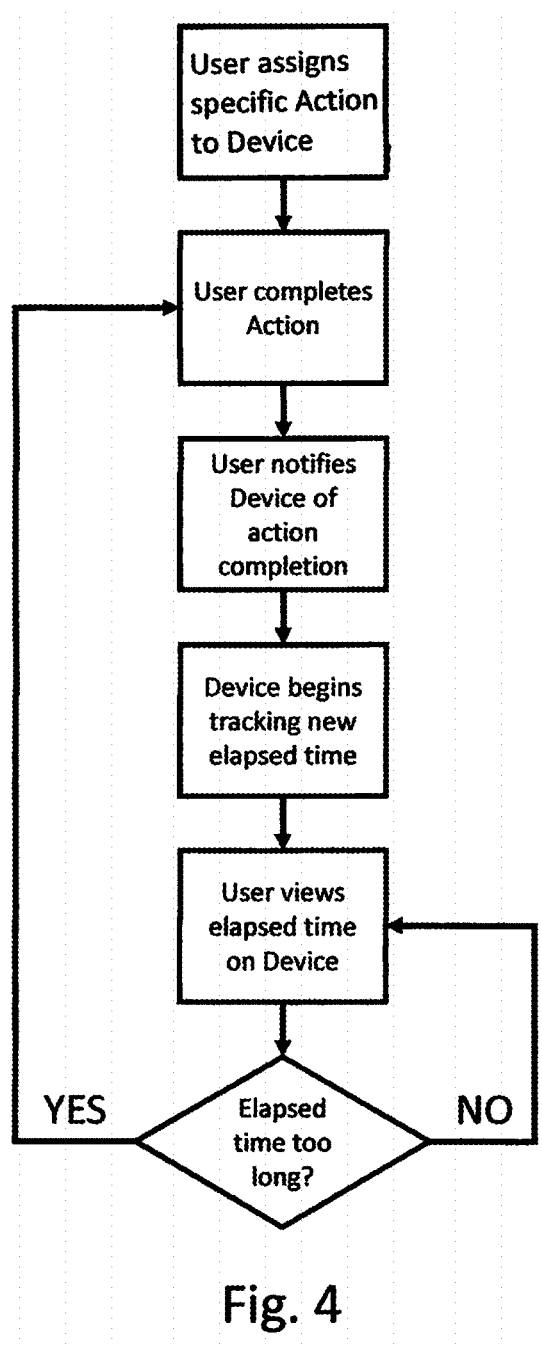
FIG. 4 is a flow diagram illustrating an embodiment of the method of the inventive subject matter disclosed herein.

FIG. 4 is a top-level flow diagram illustrating the steps involved in performing an embodiment of the method of the inventive subject matter. This embodiment will be described in conjunction with the use and operation of the reminder device 10, although our method is not limited to the functioning of that device. In other words, it is not essential to the method of the inventive subject matter that the reminder device 10 with its particular architecture and all its features be utilized. The method illustrated in FIG. 4 does, however, require use of a display capable of showing a count-up in days.

When the user initially begins to use the reminder device 10, the user assigns an "Action", i.e. routine task, to be tracked. This can be accomplished by affixing the appropriate action identifier 14 to the housing 12 and then locating the reminder device 10 on a reference surface associated with the task to be completed. This step of the method is illustrated in FIG. 4 by the box labeled "User assigns Specific Action to Device." In this example, when the action is first assigned, the display 16 indicates 0 Days 0 Hours 0 Minutes, because the device 10 has never been used before. The reference surface where the reminder device 10 is located is preferably in a location that intuitively reminds the user of the task assigned. For example, the reminder device 10 can be attached to the front edge of a shelf on which athletic shoes are stored to remind the user how long it has been since he or she last went to the gym and exercised. It is not essential that the method include the step of placing the display at a location that the user associates with the assigned Action, although such placement is beneficial.

When the user is sufficiently motivated and has the time available to exercise, the user puts on the athletic shoes and exercises at the gym. This step of the method is illustrated in FIG. 4 by the box labeled "User completes Action." Upon returning home, the user replaces the athletic shoes on the shelf adjacent the reminder device 10. The user then begins a count-up by manually actuating the ACTION COMPLETED push button switch 18 a single time. This step of the method is illustrated in FIG. 4 by the box labeled "User notifies Device of action completion." The reminder device 10 then begins to continuously display the current elapsed time, in a count-up mode, in minutes and hours and, most importantly, eventually in days. This step of the method is illustrated in FIG. 4 by the box labeled "Device begins tracking new elapsed time." At some point in time the display 16 would indicate 1 Day 22 Hours 10 Minutes, as illustrated in FIG. 1, if the ACTION COMPLETED push button switch 18 were not pressed before that amount of time had elapsed.

Referring still to FIG. 4, periodically, when the user is in the vicinity of the reminder device 10, he or she can observe the display 16 and subjectively determine if it has been too long since the assigned Action, e.g., going to the gym and exercising, was last completed. The user is thus provided with passive reminders that he or she should complete the assigned Action which equates to completing a desired routine task. This step of the method is illustrated in FIG. 4 by the box labeled "User views elapsed time on Device."

Each time the user views the elapsed time the user determines if it has been too long since the assigned ACTION was last completed and, importantly, if the user presently has the time available in his or her personal schedule to compete the assigned Action again. This determination is illustrated in FIG. 4 by the diamond labeled "Elapsed time too long?" If the user subjectively determines that too much time has elapsed, and if the user has the available time, the user completes the assigned Action, which in this example involves a trip to the gym. The user then manually actuates the ACTION COMPLETED push button switch 18 a single time upon returning home to signal the circuitry in the reminder device 10 that the action has been completed. In other words, the user exercises again and then presses the push button switch 18 a single time. This decision and action are illustrated by the YES path in FIG. 4. Alternatively, the user can take the reminder device 10 to the gym in his or her exercise clothes bag, exercise, and actuate the push button switch 18 while still at the gym. However, minutes and hours are typically not important in determining when it has been too long since a person last exercised. So, it is not necessary that a new count-up be initiated while the person is at the gym.

Optionally, manual actuation of the ACTION COMPLETED push button switch 18 is accompanied by the audible reward sound emitted by the speaker 38 (FIG. 2). The "Good job!" reward message in text form and an associated animation are shown on the display 16 for several seconds. The animated stick figure preferably takes the form of a human dancing or celebrating. In accordance with the operation program, the control and data processing circuitry 26 then re-sets the elapsed time to zero and initiates a new count-up and the current elapsed time is shown on the display 16. The new count-up automatically commences when the user actuates the ACTION COMPLETED push button switch 18 a single time. However, the ever-changing value of the new count-up is not displayed on the display 16 for five or ten seconds until the visible reward message has timed out.

If the elapsed time has not been too long, or the user's schedule will not allow completion of the Action when the user observes the display 16, the ACTION COMPLETED push button switch 18 is not manually actuated. This decision and non-action are illustrated by the NO path in FIG. 4. In this case the reminder device 10 continues to increment or count-up the elapsed time and display the current elapsed time. Periodically the user continues to view the display when in the vicinity of the device and subjectively determines if it has been too long since the assigned Action was last completed. Eventually the user determines that too much time has elapsed, completes the assigned Action and presses the ACTION COMPLETED push button switch 18.

The determination of whether an elapsed time is "too long" or "not too long" is ultimately a subjective decision of the user at the time of viewing the reminder device 10. As such, the distinction between "too long" and "not too long" can change over time depending on the user. The reminder device 10 can be configured so that the elapsed time is only displayed intermittently, e.g. every five seconds, to attract the attention of the user and/or to conserve battery power. Where the display 16 is an e-paper display the reminder device 10 can also be configured to "go to sleep" in between screen updates. The e-paper display will hold its image without power being applied. This helps conserve battery power.

To summarize, after the user performs the assigned Action, he or she depresses the ACTION COMPLETED push button switch 18. In some embodiments the display 16 can show the "Good job!" reward message in text form (not illustrated) with an animated stick figure. A pleasing audible reward can be delivered through the speaker 38 at the same time. The time keeping circuitry 24 is reset, a new count-up is initiated, and the elapsed time is continuously shown on the display 16 once the visible reward message has concluded.

Optionally the reminder method of the inventive subject matter can include the additional steps (not illustrated in FIG. 4) of: a) the user selectively observing data on the display representative of intervals between a plurality of successive completions of the task; and b) the user adjusting the actual frequency of his or her task completion based on the displayed data so that the actual frequency more closely approximates the desired frequency. To facilitate these steps, the user can press the MENU push button switch 20 at any time to enter a menu mode. Subsequent pressing of the MENU push button switch 20 allows the user to selectively display various forms of logged data and analytics representative of intervals between a plurality of successive completions of the task. Once the various modes of displaying logged data and analytics are cycled through by successive manual actuations of the MENU push button switch 20, the current elapsed time is then shown on the display 16 once again. The MENU mode can automatically time out and the reminder device will then revert to showing the current elapsed time. This avoids having to push the MENU push button switch in order to return to the elapsed time display mode.

Observing logged data representative of intervals between a plurality of successive completions of the assigned Action helps the user learn how he or she is progressing in terms of achieving a goal of completing the assigned Action with a desired frequency. Based on the displayed data the user can adjust his or her actual frequency of task completion, e.g. perform the assigned Action sooner the next time. The method of the inventive subject matter can further optionally include the step of transferring the data to servers, websites and/or external computing devices via the wireless communications link 48 or via a data port as described hereafter.

Table I set forth hereafter lists potential use cases for the reminder device 10. The numbers in the column under the "Days" heading indicate the desired interval length or range of interval lengths for the activity listed in the corresponding row.

TABLE I

| Activity to Track | Category | Days |
|---|---|---|
| Contact a New Customer | Business | 1-2 |
| Water My Garden | Chores | 1-2 |
| Take Out the Recycle | Chores | 5-7 |
| Do the Laundry | Chores | 7-14 |
| Clean Room Air Filter | Chores | 7-10 |
| Take Out the Trash | Chores | 2-3 |
| Water Indoor Plants | Chores | 7 |
| Play Time at Local Park | Family | 3-5 |
| Date Night w/ Spouse | Family | 7-14 |
| Read to My Kids | Family | 1-2 |
| Brush My Teeth | Health | 1 |
| Whiten My Teeth | Health | 1-2 |
| Do Push-ups | Health | 1-2 |
| Floss My Teeth | Health | 1 |
| Go to the Gym | Health | 1-2 |
| Do Indoor Yoga | Health | 1-3 |
| Do Meal Prep | Health | 7 |
| Go to Sleep on Time | Health | 1 |
| Stick to My Diet | Health | 1 |
| Take a Walk | Health | 1-3 |
| Take My Blood Pressure | Health | 1 |
| Take My Medication | Health | 1 |
| Take My Vitamins | Health | 1 |
| Call My Mom | Personal | 7 |
| Update Gratitude Journal | Personal | 1 |
| Update Personal Diary | Personal | 7-14 |
| Practice Spanish | Personal | 1-3 |
| Meditate | Personal | 1-2 |
| Play the Piano | Personal | 1-2 |
| Play the Guitar | Personal | 1-3 |
| Work on My Finances | Personal | 1-2 |
| Read a Book | Personal | 1-2 |
| Work on Photo Album | Personal | 1-2 |
| Write a Part of My Novel | Personal | 1-2 |
| Feed My Dog | Pets | 1 |
| Feed My Fish | Pets | 5-7 |
| Treat My Cat for Fleas | Pets | 30 |
| Walk My Dog | Pets | 1-3 |
| Finish My Homework | School | 1-2 |

The Second Embodiment of the Reminder Device

Figure 5:
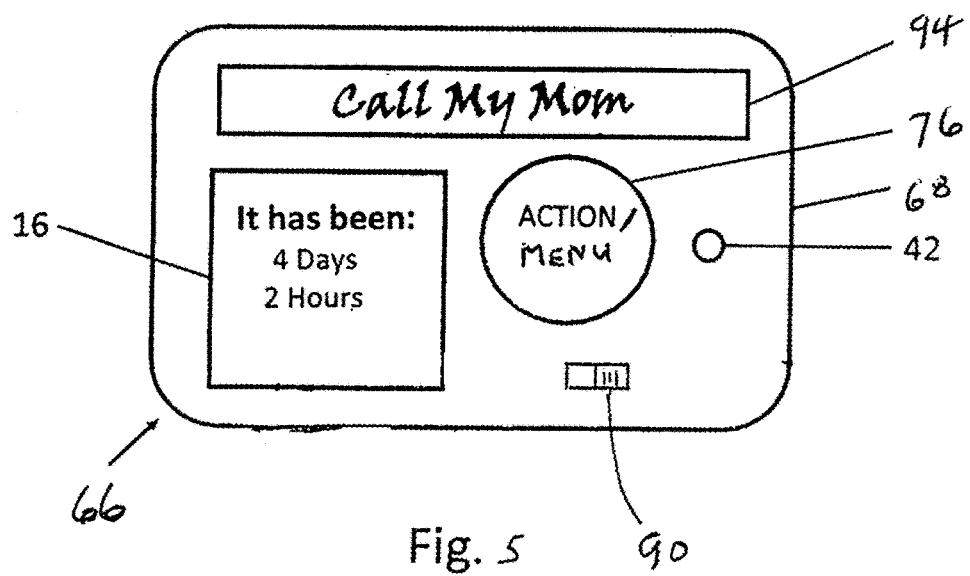
FIG. 5 is a plan view of the front of a second embodiment of the reminder device of the inventive subject matter disclosed herein that has only a single push button switch, a motion sensor, and a data port.
Figure 6:
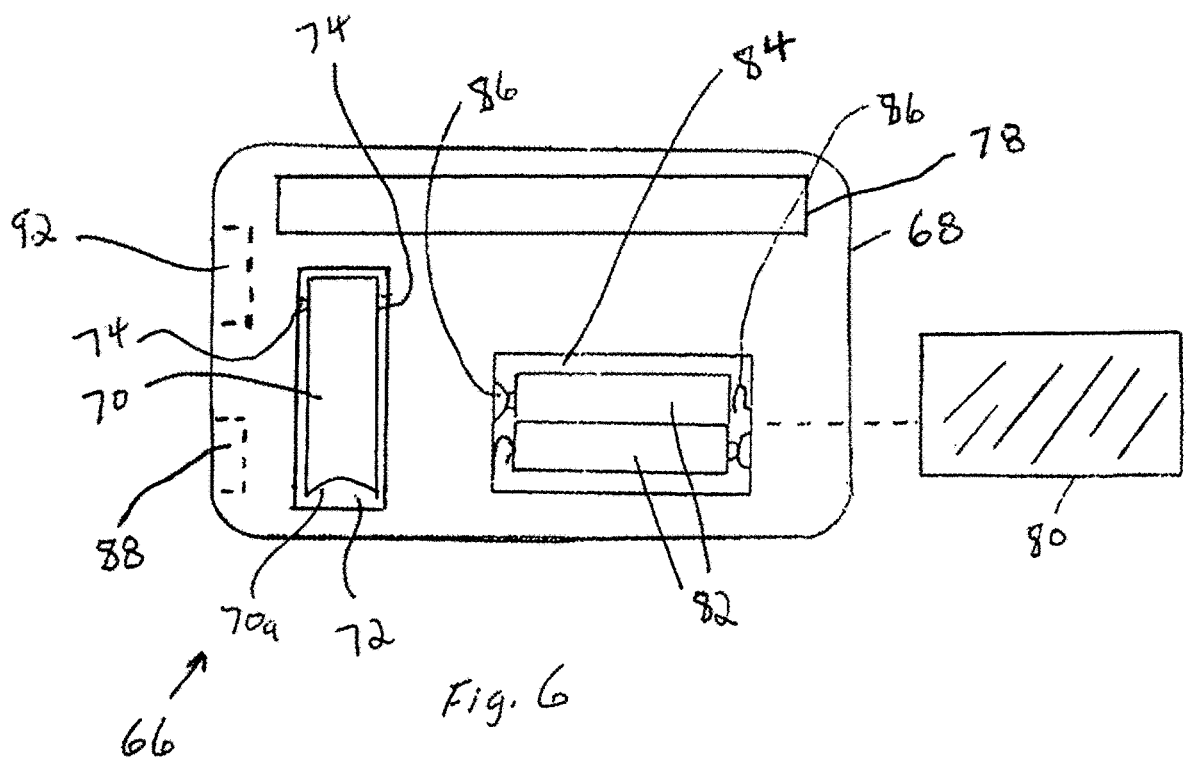
FIG. 6 is a plan view of the rear of the reminder device of FIG. 5.
Figure 7:
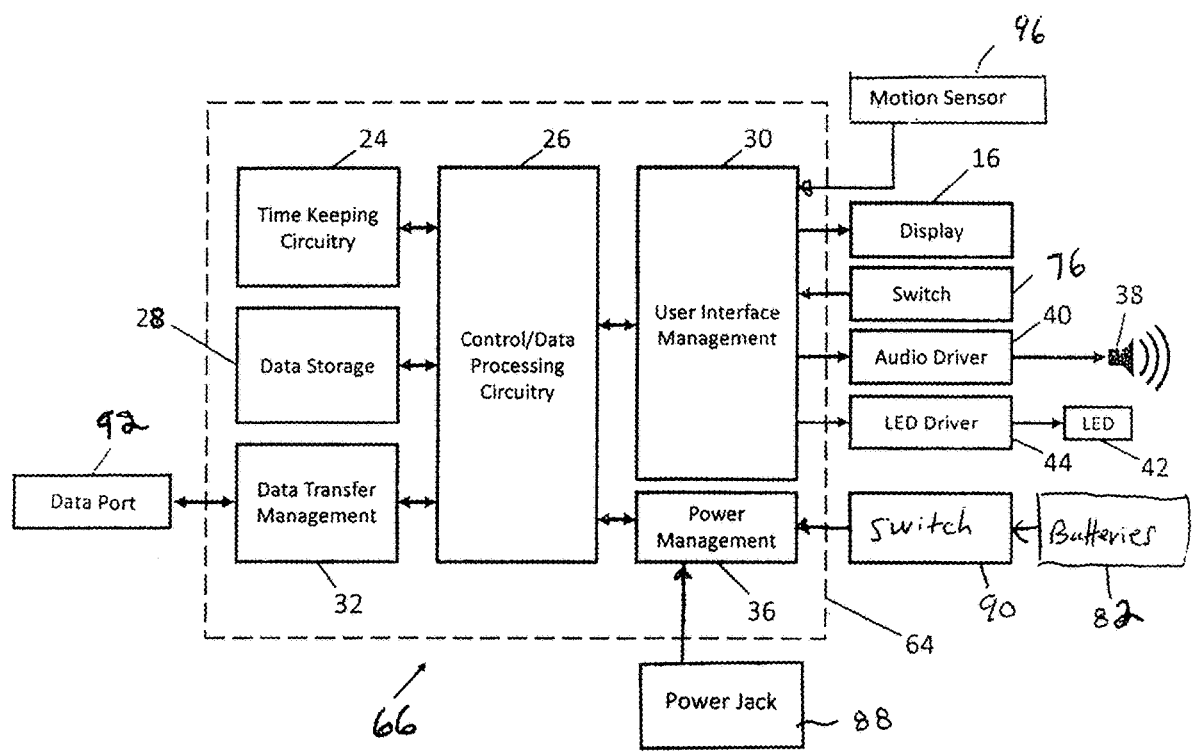
FIG. 7 is a functional block diagram illustrating the circuitry of the reminder device of FIG. 5.

FIGS. 5-7 illustrate a second embodiment 66 of the reminder device of the inventive subject matter. It has an injection molded plastic outer housing 68 (FIG. 5) with a form factor similar to that of the housing 12 of the reminder device 10. A leg 70 (FIG. 6) is mounted in an outwardly opening receptacle 72 formed in the rear face of the housing 68. The leg 70 is mounted in the receptacle 72 for rotation about a pair of pivot pins 74. A curved edge 70a of the lower end of the leg 70 can be engaged by the tip of an index finger to swing the lower end of the leg 70 outwardly from the housing 68. A stop or shoulder (not illustrated) limits the outward travel of the leg 70. In this configuration the leg 70 supports the housing 68 at a predetermined angular orientation on a reference surface for convenient viewing of the display 16. As an example, with the leg 70 extended, the reminder device 66 can be placed on top of a dresser near a framed picture of a woman's mother that also sits on top of the dresser.

The switch means of the first embodiment for receiving commands from the user (illustrated in FIG. 1) is preferred due to its ease of operation. However, instead of utilizing dual push button switches 18 and 20 the second embodiment 66 of the reminder device of the inventive subject matter includes only a single push button switch 76 (FIG. 5). In the second embodiment, the lone push button switch 76 operates as a hybrid ACTION/MENU command initiator. It can be momentarily depressed, e.g. for no more than one or two seconds, to initiate a count-up. After the task has been completed the lone push button switch 76 can be momentarily depressed a second time to initiate a new count-up. This operation is similar to that of the first embodiment of FIGS. 1 and 2.

However, in order for the second embodiment 66 to display data representative of intervals between completions of the assigned Action, the user can manually actuate the lone push button switch 76 in a different manner. The user can press the lone push button switch 76 for an extended period of time, e.g. at least five seconds, and then release the same in order to enter a menu mode. Subsequent momentary pressing of the lone push button switch 76 enables the user to cycle through various kinds of logged data and analytics by successively depressing the lone push button switch 76 in a momentary fashion. Then subsequent depressing of the lone push button switch 76 for the same extended period of time once again causes the reminder device 66 to exit its menu mode and cause the still-running elapsed time to be displayed. A subsequent momentary pressing of the lone push button switch 76 initiates a new count-up.

To recapitulate, the second embodiment 66 of the inventive subject matter includes only a single manually actuated switch 76. In accordance with the operation program, the control and data processing circuitry interprets different manners of operation of the lone push button switch 76, e.g. predetermined sequences and durations of manual actuation, as different user commands, i.e., to either initiate a new count-up, or to selectively display stored data.

A magnetic strip 78 (FIG. 6) is adhesively affixed to the rear face of the housing 68 of the second embodiment 66. The leg 70 can be folded inwardly flush with the rear face of the housing 68. The magnetic strip 78 then provides a convenient means for attaching the reminder device 66 to a refrigerator having a metal door. Preferably the magnetic strip 78 consists of a high-coercivity ferromagnetic compound such as ferric oxide mixed with a plastic binder.

The rear face of the housing 68 of the second embodiment 66 is formed to receive a removable lid or door 80 (FIG. 6) that permits installation and replacement of conventional cylindrical alkaline batteries 82 with positive and negative terminals. The batteries 82 are installed side-by-side in an outwardly opening battery compartment 84. Mating electrical contacts 86 are mounted at the opposite ends of the battery compartment 84 thereby making the power from the batteries 82 readily connectable to the circuitry inside the housing 68. The door 80 is illustrated in a removed position in FIG. 6 as indicated by the horizontal phantom line. When replaced on the rear of the housing 68, the door 80 covers and seals the battery compartment 84.

The second embodiment 66 can be shipped from the factory with a battery isolator pull-tab (not illustrated) installed so that it extends outside the housing 68 from the battery compartment 84 with the door 80 in place. The battery power source can be bypassed with a standard AC/DC power converter (not illustrated) with a suitable DC voltage and amperage. A plug on a cable from the converter can be removably connected to the reminder device 66 through a power jack 88 (FIGS. 6 and 7) mounted in one the end of the housing 68. This can power the reminder device 66 instead of the device receiving its power from the batteries 82.

As illustrated in FIG. 5, the reminder device can merely display the number of days and hours elapsed since the last completion of the assigned routine task, and not the number of minutes. It is important that the reminder device be capable of displaying an elapsed time that includes the number of days, and preferably, an elapsed time since the last action completion of as long as about one day to at least about ninety-nine days. The meaning of "day" or "days" as used herein in reference to information shown on the display 16 includes these words in English and their foreign language equivalents.

A separate ON/OFF slide switch 90 (FIGS. 5 and 7) is included in the second embodiment of the reminder device 66 for disconnecting the batteries 82 from the circuitry. If an AC/DC power converter has been connected to the reminder device 66 it must also be disconnected to turn the device OFF. The reminder device 66 can thus be de-activated while the user is away on vacation, or on a business trip by sliding the switch 90 to its OFF position and disconnecting the converter. Otherwise, depending on the length of the user's absence from the household, the logged data could be distorted. It might not accurately reflect how well the user was actually doing in regard to timely completion of an assigned routine task when the user was not traveling. When the device 66 is placed in its OFF state the current count-up is stored. Upon returning from the vacation or business trip, the user slides the switch 90 to its ON position or re-connects the AC/DC power converter and the device once again increments the stored count-up.

Instead of using a Wi-Fi communications link the transfer of logged data and/or analytics to external computing devices can be accomplished via a Bluetooth communications link. Bluetooth is a wireless technology industry standard that enables data to be exchanged over short distances using short wavelength UHF radio waves in the ISM band from 2.4 to 2.485 GHz. Other means for transferring such information externally of the reminder device can be used instead of wireless communications links. The second embodiment of the reminder device 66 is equipped with a data port 92 (FIGS. 6 and 7). The data port 92 provides a convenient means for directly downloading data stored in the data storage 28 to an external computing device.

By way of example, the data port 92 can take the form of a USB port or an SD card slot, to allow a flash drive (memory stick) or an SD card, respectively (not illustrated), to be plugged into the reminder device 66. Insertion of the flash drive or SD card triggers the automatic downloading of logged data and analytics onto the removable storage media for transfer to an external computing device for further manipulation and display. A USB cable (not illustrated) can also be plugged into the USB port of the reminder device 66 to provide a hard-wired data link to an external computing device. While advantageous, it is not essential that the reminder device 10 include a means for transferring logged data and/or analytics to an external computing device. Updates and other changes to the operating program of the reminder device 66 can be uploaded into the data storage 28 via the data port 92.

Different forms of Action identifiers can be associated with the housing of the reminder device besides the pre-printed peel-and-stick label 14 (FIG. 1). For example, the Action identifier can take the form of a miniature white board 94 (FIG. 5) to allow different Actions to be handwritten thereon with a suitable non-permanent marker and later erased if the assigned Action for the reminder device changes. Suitable materials for the miniature white board 94 include high gloss vinyl and coated paper. The Action identifier can instead be selected from a stored list of use cases using the ACTION/MENU push button switch 76 and shown on the display 16 in text form. The Action identifier need not display verbal information and instead can be a graphic representation of the task to be completed, such as a stick figure running on a track, lifting weights, or rowing a boat, for example. The Action identifier can also be transferred to the reminder device via a web page or a connected external computing device via wireless connection.

The electronic circuitry of the second embodiment of the reminder device 66 includes manually actuable switch means in the form a motion sensor 96 (FIG. 7), such as a MEMS accelerometer. An example of a suitable commercially available MEMS accelerometer is part No. FXLN8361Q which is a 3-axis accelerometer manufactured by NXP Semiconductors, Netherlands, B.V. Instead of manually actuating the push button switch 76 the user can simply pick up the reminder device 66, and then replace it in its original location. In accordance with the operation program, the control and data processing circuitry 26 interprets specific signals from the motion sensor 96 as a command to freeze the elapsed time shown on the display 16 for a predetermined delay period, e.g. thirty seconds. This allows the user to make a mental note of how long it has been since the last time he or she previously completed the assigned Action. After causing the "Good job!" reward message to be shown on the display 16, and after the expiration of the predetermined delay period, the operation program then initiates a new count-up and a new current elapsed time is shown on the display 16.

The Third Embodiment of the Reminder Device

Figure 8:
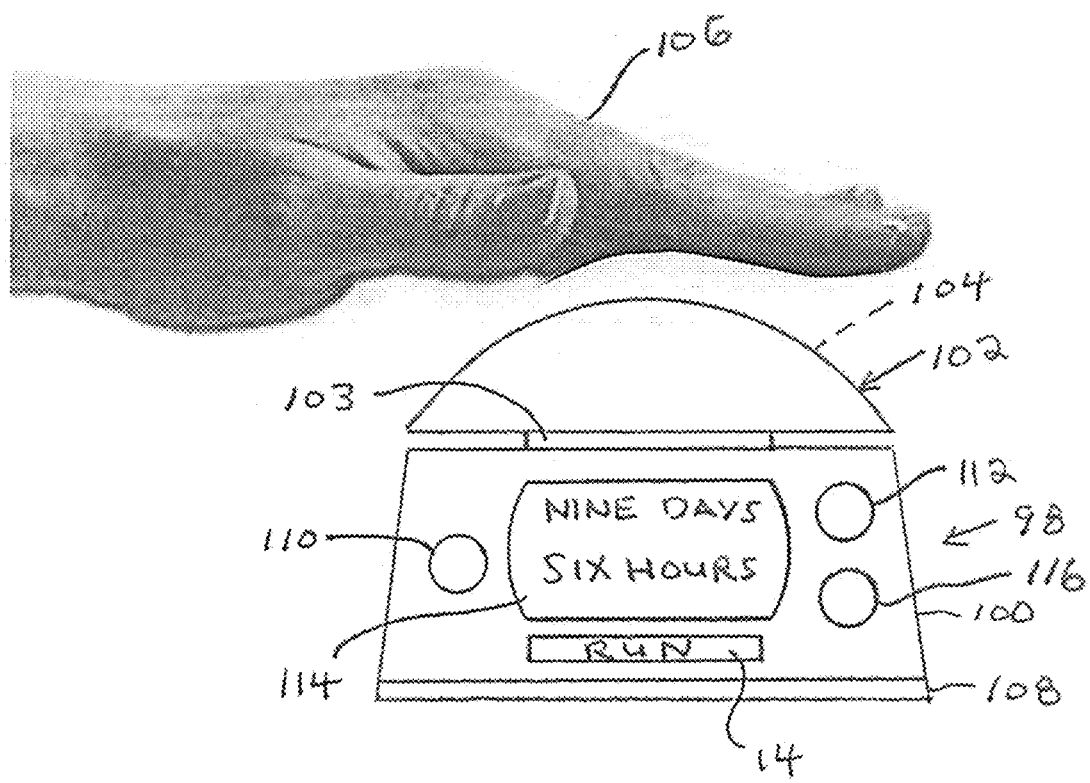
FIG. 8 is a plan view of the front of a third embodiment of the reminder device of the inventive subject matter disclosed herein and illustrating the manual actuation of a switch forming the upper portion of its housing.

FIG. 8 illustrates a third embodiment 98 of the reminder device of the inventive subject matter. The reminder device 98 has a different form factor than the first embodiment 10 and the second embodiment 66. The reminder device 98 includes an upwardly tapered outer housing 100 made of injection molded thermoplastic material. The housing 100 has a relatively broad base in order to sit on a countertop, shelf or desktop in a stable, upright, self-supporting fashion. By way of example, a suitable size for the housing 100 is approximately 15.2 cm×5.8 cm×15.2 cm. This size allows the reminder device 98 to easily enclose a circuit board and two AAA batteries (not illustrated).

The reminder device 98 includes an ACTION COMPLETED push button switch with a relatively large convex-shaped actuating member 102 forming the upper portion of the housing 100. The actuating member 102 has an interior rigid injection molded thermoplastic frame 103 and a thin contoured outer surface 104 made of a suitable soft foam material such as neoprene. The frame of the actuating member 102 is coupled to the electro-mechanical components of the push button switch (not illustrated) and supported in spring-biased fashion so that it can move down and up a small distance. The size and shape of the actuating member 102 allows for the convenient and satisfying manual actuation of the ACTION COMPLETED push button switch.

As illustrated in FIG. 8, manual actuation of the ACTION COMPLETED push button switch of the reminder device 98 is accomplished by quickly depressing or tapping the actuating member 102 with one or more fingers 106 of the user's hand upon completion of the assigned task. The user can also depress the actuating member 102 with the palm of one of the user's hands. The user experiences a tactile feedback that lets the user know that his or her ACTION COMPLETED command has been received by the reminder device. Optionally, manual depression of the actuating member a sufficient amount to close the electrical switch contacts can also be confirmed to the user with a beep or other audible signal.

A cap 108 (FIG. 8) made of an elastomeric material fits over the base of the housing 100 and provides a gummy non-slip surface. One suitable elastomeric material is silicone rubber. This non-slip surface impedes lateral sliding motion of the reminder device 98 upon manual actuation of the top-mounted ACTION COMPLETED push button switch. The reminder device 98 also includes a MENU push button switch 110 and a SELECT push button switch 112. Manual actuation of the SELECT push button switch 112 allows the user to implement the option currently shown on an LCD display 114 upon appropriate scrolling via manual actuation of the MENU push button switch 110. A fourth push button switch 116 can be manually actuated to turn the reminder device 98 ON and OFF.

The Fourth Embodiment of the Reminder Device

Figure 9:
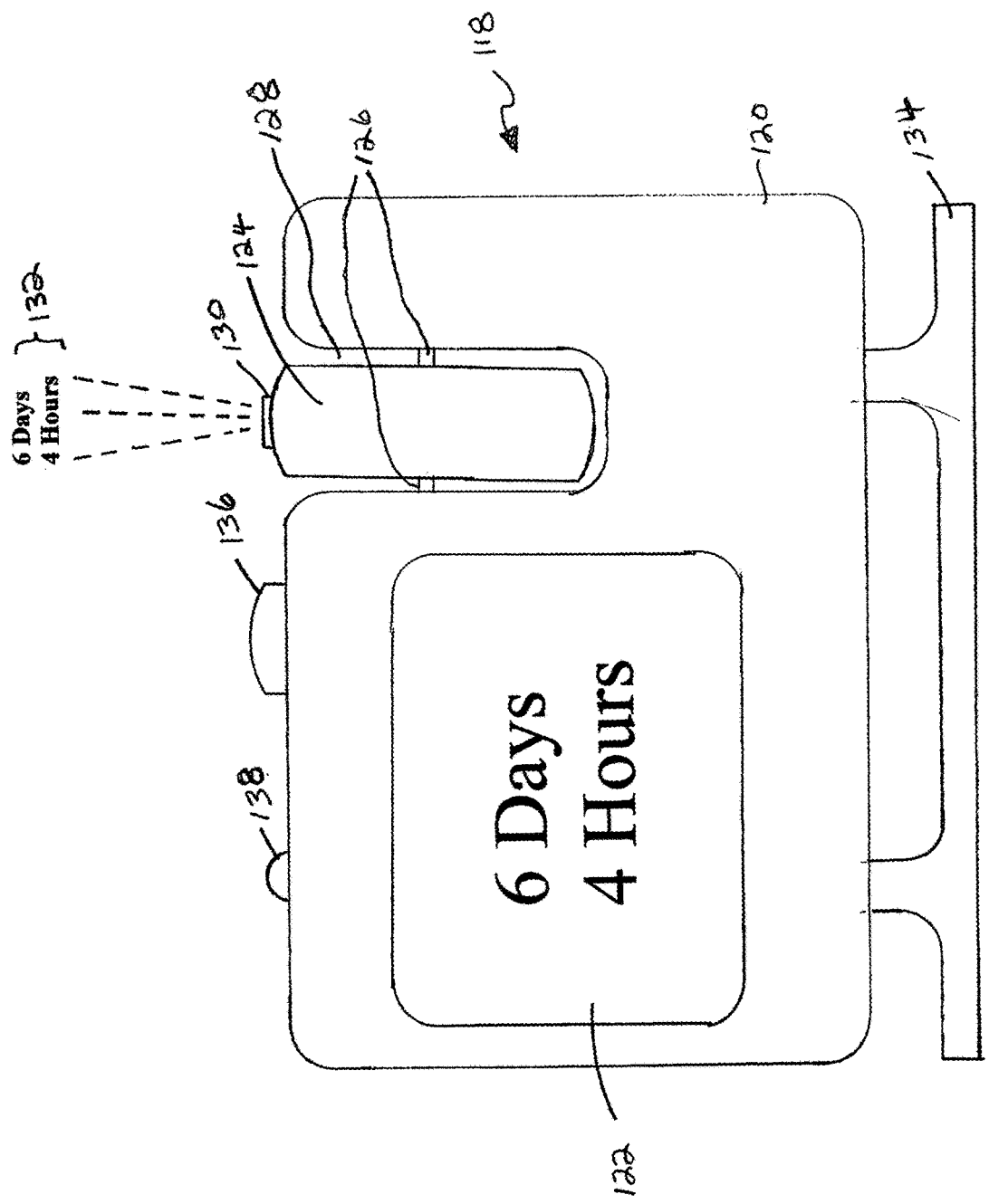
FIG. 9 is an enlarged front elevation view of a fourth embodiment of the reminder device of the inventive subject matter disclosed herein that can project the elapsed time on a wall or ceiling.

FIG. 9 illustrates a fourth embodiment 118 of the reminder device of the inventive subject matter. The reminder device 118 includes a rectangular outer housing 120 that incorporates an LCD display 122 that shows the elapsed time in days and hours since the assigned Action was last completed. The LCD display 122 can also show other information such as rewards and progress reports (not illustrated in FIG. 9). In addition to the LCD display 122, the reminder device 118 also includes a second display in the form of a red LED-based projector 124. The projector 124 is pivotally mounted on pins 126 in a recess 128 formed in the upper right side of the housing 120. The projector 124 includes a lens 130 and can be aimed at a nearby wall or ceiling (not illustrated) which serves as a projection screen on which the elapsed time is displayed. The elapsed time is continuously shown on the LCD display 122 and simultaneously projected onto the wall or ceiling by the projector 124. An image 132 of the elapsed time in days and minutes is visible to the user on the wall or ceiling in low light conditions or at nighttime. The light rays emitted through the lens 130 and the image 132 are illustrated diagrammatically in FIG. 9 as diverging dashed lines. During the day, when the ambient light is too bright for the projected elapsed time to be seen by the user, it can still be viewed on the LCD display 122. The housing 120 is supported by a stylized stand 134 mounted to its lower edge. The stand 134 can rest on a nightstand or dresser, for example. A large ACTION COMPLETED push button switch 136 and a small MENU push button switch 138 are conveniently mounted on the top of the housing 120.

The Fifth Embodiment of the Reminder Device

Manually actuated switches can be partially eliminated, or entirely eliminated, from the reminder device of the inventive subject matter. The reminder device can instead execute the functions taught herein upon receipt and recognition of a specific voice command or voice commands enunciated by the user and received through an audio receiver. Thus the manually actuated switches of the first four embodiments provide one means for the circuitry of the reminder device to receive user commands. The audio receiver provides an alternate means for the reminder device to receive user commands.

Figure 10:
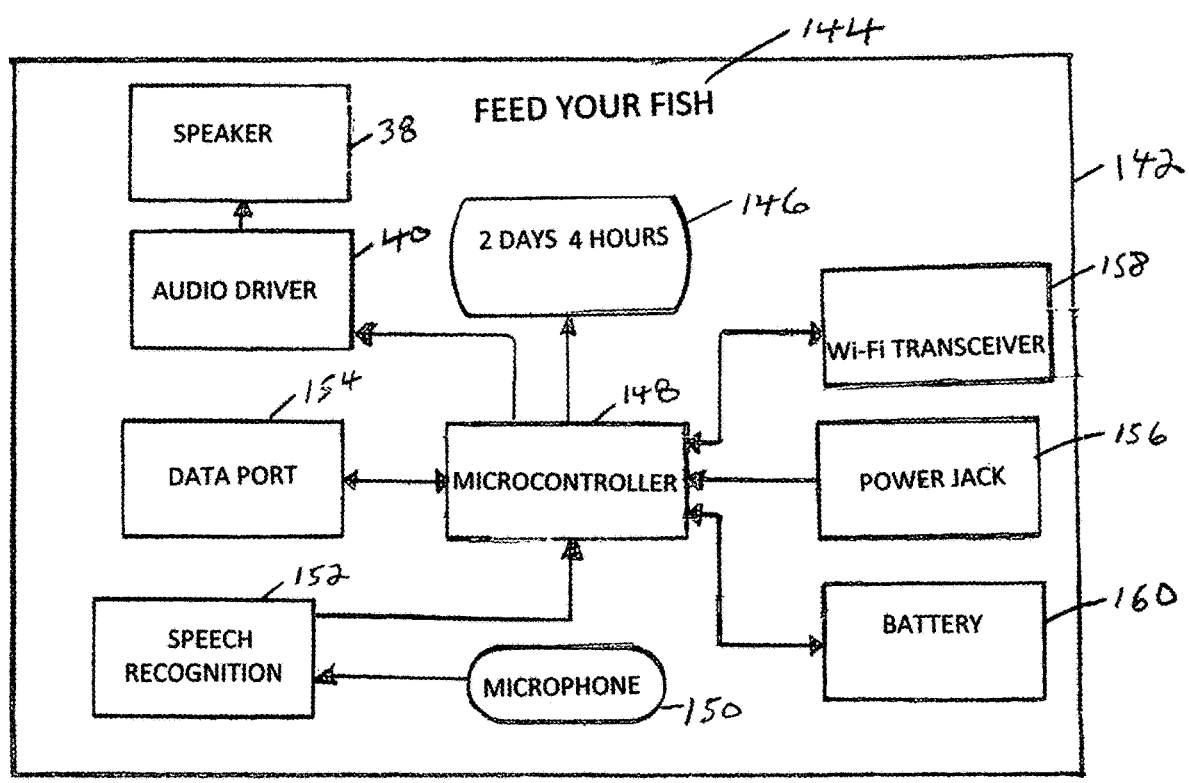
FIG. 10 is a functional block diagram of a fifth embodiment of the reminder device of the inventive subject matter disclosed herein that can receive voice commands from the user.

FIG. 10 illustrates a fifth embodiment 140 of the reminder device of the inventive subject matter. It includes an outer housing 142 that bears an action identifier 144 in the form of a label that reads FEED YOUR FISH. A printed circuit board (not illustrated) is mounted within the housing 142 which supports the circuitry hereafter described. An LCD display 146 is visible through an opening in the housing and is operatively connected to a microcontroller 148. Spoken user commands are received through a miniature microphone 150 and interpreted by a speech recognition module 152. By way of example, the microphone 150 can be a condenser microphone, an electret microphone, or a MEMS microphone. A MEMS microphone is preferred because it is relatively small and can be surface-mounted on the printed circuit board. The microphone 150 is mounted behind a louvered opening (not illustrated) in the front face of the outer housing 142. Alternatively, an external microphone (not illustrated) can be mounted near the housing 142 and connected to the circuitry via a chord. The circuitry of the reminder device 140 also includes a data port 154, a power jack 156, and a Wi-Fi transceiver 158. Power can also be supplied to the circuitry via a battery 160.

By way of further example, one suitable component that can function as the speech recognition module 152 is the HM2007 chip commercially available from HMC company. It is a large scale integration ("LSI") CMOS chip which includes analog circuitry that processes signals from the microphone 150 and converts them into digital form for on-chip recognition and system control functions. The HM2007 chip recognizes a spoken "completed" command and sends an instruction to the microcontroller 148 to cause it to initiate a new count-up. The HM2007 chip can also enable the reminder device 140 to respond to a spoken "report" command by showing a progress report on the display 146.

Another suitable component that can function as the speech recognition module 152 is the NLP-5× chip commercially available from Sensory, Inc. This chip incorporates a 16-bit digital signal processor ("DSP"), integrates analog and digital processing blocks, and accommodates a variety of communications interfaces. The NLP-5× chip can utilize FluentChip™ firmware, which is commercially available from the same company, in order to perform its speech recognition functions.

The reminder device 140 can communicate with a more sophisticated cloud based hybrid speech recognition and task completion analytics system via its Wi-Fi transceiver 158. This allows the reminder device 140 to intelligently respond to various multi-word commands and inquiries. An example of such an inquiry is: "Reminder device—how often am I calling my mother?" The reminder device 140 can then give an audible progress report via the speaker 38 and the audio driver 40. An example of an audible progress report from the reminder device 140 is: "You last called your mother 4 days ago. Your current average time between calls is 6.2 days. You are getting closer to your goal of calling your mother every 4 days. Keep up the good work."

Utilizing the cloud based hybrid system, the reminder device 140 can be programmed to only respond to spoken commands and inquires prefaced with a pre-determined name of the device. This is similar to the way that the Amazon Echo™ information device only responds to spoken commands and inquiries prefaced with "Alexa." The reminder device 140 can be provided with a source of illumination (not illustrated) which is controlled by the microcontroller 148. This source of illumination can be energized to reflect the receipt of a spoken command or inquiry. The source of illumination can also be energized in varying intensities that mimic the tone and pattern of the device's audible reply.

The Sixth Embodiment of the Reminder Device

Instead of mounting manually actuable ACTION COMPLETED and MENU push button switches in the housing of the reminder device, these switches can be mounted in a small battery powered remote control. The remote control can utilize an infrared, RF or other short range wireless communications link typically used in home appliance and garage door remote controls. This link includes a transmitter that sends signals to a compatible infrared, RF or other short range wireless receiver in the reminder device which thus functions as a means mounted in the housing for receiving commands from the user.

Figure 11:
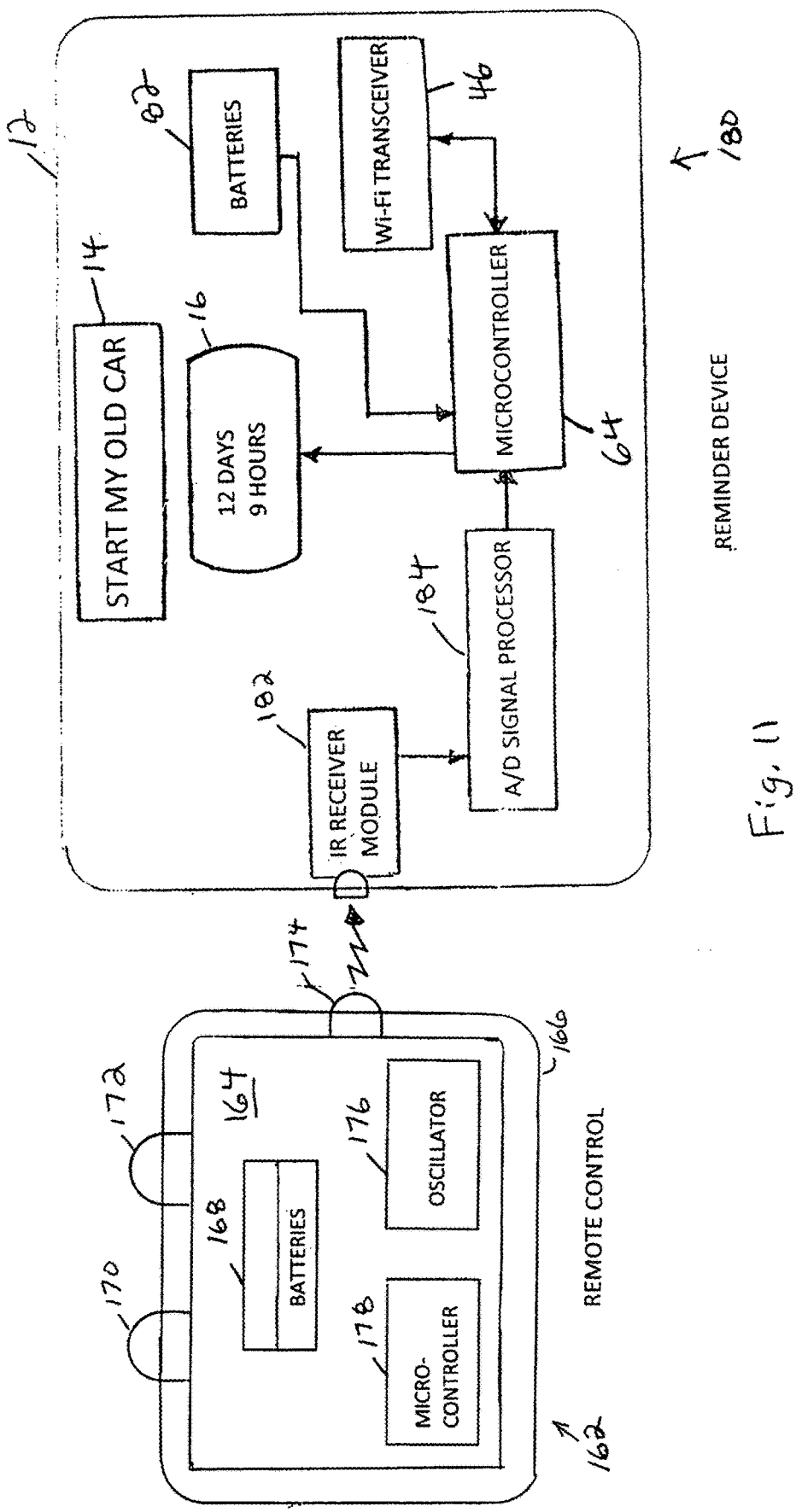
FIG. 11 is a functional block diagram of a sixth embodiment of the reminder device of the inventive subject matter disclosed herein that can receive user commands from a remote control.

Referring to FIG. 11, a remote control 162 includes a printed circuit board 164 mounted inside a small plastic 166 housing. The housing 166 is sized to fit in the palm of the user's hand and encloses two AAA batteries 168. The housing can be much smaller so that it can be conveniently attached to a user's key chain in which case the remote control 162 can use a single coin cell battery. The printed circuit board 164 supports a pair of push button switches 170 and 172 for sending the ACTION COMPLETED and MENU commands. The switches 170 and 172 protrude through aligned holes (not illustrated) in the upper surface of housing 166 for easy manipulation with the user's thumb. The printed circuit board 164 also supports an infrared LED 174, and integrated circuits in the form of an oscillator 176 and a microcontroller 178. The infrared LED 174 protrudes through an opening (not illustrated) in the front end of the housing 166. One suitable oscillator is the ZTB455E ceramic resonator, commercially available from ESC Inc. International. The LED 174 emits infrared radiation at a carrier frequency of 455 kHz. Manual actuation of the switches 170 and 172 modulates the carrier frequency to encode different ACTION COMPLETED and MENU commands. For ease of illustration, the electrical connections of the oscillator 176, microcontroller 178, switches 170 and 172, batteries 168 and infrared LED 174 are illustrated in FIG. 11 as being accomplished via the printed circuit board 164 without illustrating its conductive traces.

The separate reminder device 180 includes means for receiving commands from the user in the form of an IR receiver module 182 that is operatively connected to the microcontroller 64. In order for the remote control 162 to communicate with the reminder device 180 the IR receiver module 182 must be in the line of sight of the emissions from the infrared LED 174. The infrared radiation path is illustrated diagrammatically in FIG. 11 by the zig-zag arrow. The IR receiver module 182 includes a photodetector and a preamplifier. Preferably the photodetector is mounted in a hole in the front face of the housing 12 (not illustrated) so that the user can send commands to the reminder device 180 by pointing the front end of the remote control 162 at the front face of the housing 12 and manually actuating one of the push button switches 170 and 172. One suitable component for the IR receiver module 182 is the TSOP98200 miniaturized sensor commercially available from Vishay Intertechnology, Inc. The IR receiver module 182 receives the modulated infrared signal from the remote control 162 and transmits an amplified analog signal to an analog-to-digital ("A/D") signal processor 184. The signal processor 184 demodulates the analog signal, decoding the same, and outputs different digital signals to the microcontroller 64 in response to manual actuation of the ACTION COMPLETED and MENU push button switches 170 and 172.

The Seventh Embodiment of the Reminder Device

Figure 12:
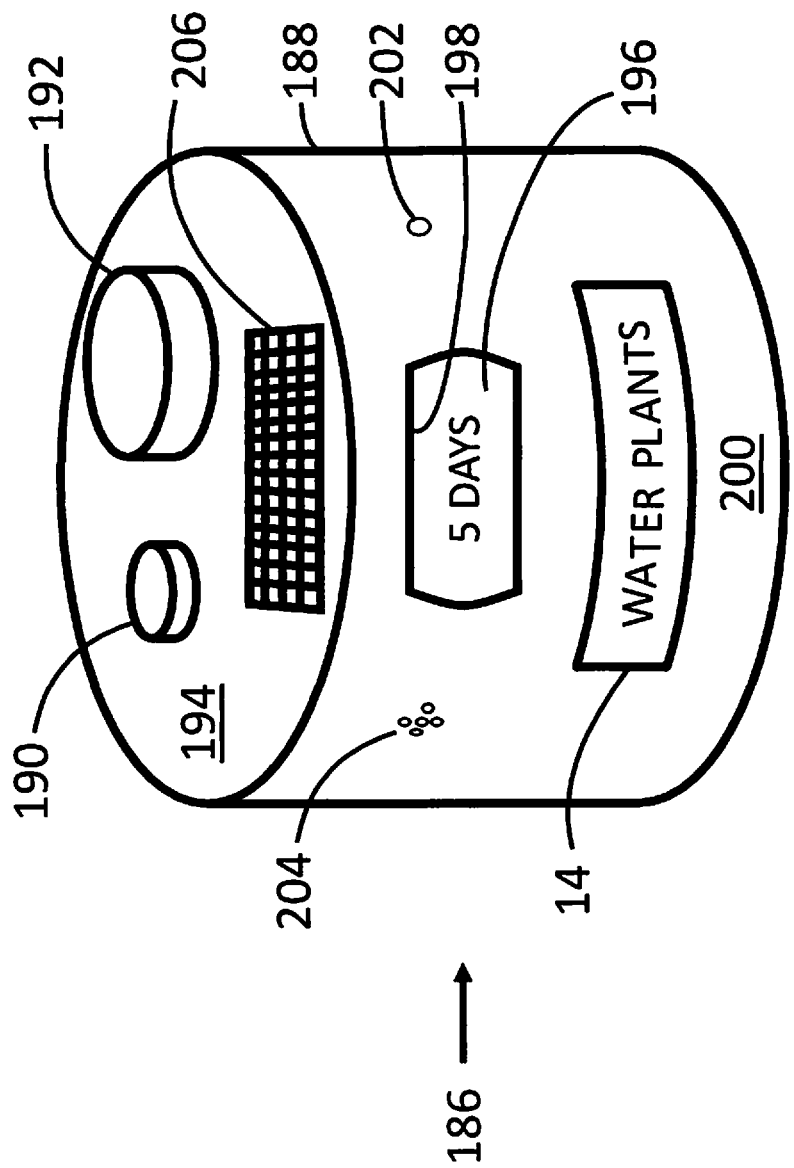
FIG. 12 is a perspective view of a seventh embodiment of the reminder device of the inventive subject matter disclosed herein that includes a cylindrical outer housing and a miniature solar panel.

Referring to FIG. 12, a seventh embodiment of the reminder device 186 includes a hollow cylindrical housing 188. The cylindrical housing 188 is made of bamboo or a hardwood such as cherry, oak, walnut, or Hawaiian koa. The natural material from which the cylindrical housing 188 is fabricated provides a durable, non-electrically conductive container with an aesthetically pleasing appearance. A small MENU push button switch 190 and a large ACTION COMPLETED push button switch 192 are mounted in suitably sized holes drilled through a circular top panel 194 of the cylindrical housing 188. An LCD display 196 is mounted inside the cylindrical housing 188. The elapsed number of days since the last manual actuation of the ACTION COMPLETED switch 192 can be shown on the LCD display 196. The elapsed number of days, along with rewards, stored data representative of intervals, and progress reports, can be viewed through a curved cut-out 198 which extends through the curved vertical wall 200 of the cylindrical housing 188. The curved cut-out 198 can be formed with a routing bit. The rectangular Action identifier label 14 is affixed to the cylindrical housing 188 below the curved cut-out 198. The Action identifier label 14 is an adhesive strip that is affixed to the surface of the cylindrical housing 188 and assumes its curved shape.

The width-to-height ratio of the cylindrical housing 188 is selected to provide stability when the reminder device is placed on a countertop, a night stand, or a shelf and its push button switches 190 and 192 are manually actuated. By way of example, the cylindrical housing 188 can measure 7 cm×4% cm. Silicone pads or feet (not illustrated) are affixed to a removable circular bottom panel of the cylindrical housing 188 (not visible in FIG. 12). The silicone pads impede sideways slippage of the reminder device 186 during manual actuation of its push button switches 190 and 192.

A green LED 202 is mounted in a small hole drilled through the curved vertical wall of the cylindrical housing 188 to the right of the curved cut-out 198. The green LED 202 flashes intermittently when the level of power stored in re-chargeable batteries (not illustrated) removably mounted within the cylindrical housing 188 drops below a predetermined threshold level. The batteries are stored in the bottom of the cylindrical housing 188 for ease of replacement. The batteries can be re-charged in a conventional external recharging station (not illustrated). The mass of the batteries gives the reminder device 186 a low center of gravity which enhances its stability when either of its push button switches 190 or 192 is manually actuated.

An audio speaker (not illustrated) is mounted within the cylindrical housing 188 behind a plurality of small holes drilled through the curved vertical wall of the cylindrical housing 188 to the left of the curved cut-out 198. These small holes are arranged in a generally circular cluster to form a speaker grill 204. The audio speaker delivers audible rewards and switch actuation confirmation beeps through the speaker grill 204.

A circular printed circuit board (not illustrated) is mounted horizontally within the cylindrical housing 188 directly beneath the top panel 194. The printed circuit board is operatively connected to the switches 190 and 192, the LCD display 196, the gen LED 202, the speaker, and the batteries, via insulated wires and/or electrical connectors (not illustrated). Electronic components are surface-mounted on the printed circuit board to provide circuitry similar to that illustrated in FIG. 2. The functionality of the reminder device 186 is enabled through the operation program executed by the microcontroller 64 as previously described.

A miniature solar panel 206 is mounted in a rectangular aperture machined through the circular top panel 194 and is connected to the power management circuitry 36. The solar panel 206 provides additional power generated from incident sunlight or artificial light that helps conserve battery power. Mounting the solar panel 206 at the top of the cylindrical housing 188 maximizes the amount of solar radiation received by the reminder device 186 when located in a garden window, for example. One suitable miniature solar panel is the IXOLAR™ SolarBIT solar panel manufactured by IXYS Korea Ltd. This solar panel includes high efficiency monocrystalline silicon solar cells. It is manufactured in the form of a sealed surface-mount package that measures 22 mm×7 mm. The power conversion efficiency of the monocrystalline silicon solar cells in the IXOLAR™ SolarBIT solar panel is 22%, i.e. 22% of the received light energy is converted to electrical energy. This solar panel has a wide spectral sensitivity from 300 nanometers to 1100 nanometers. Environmentally conscious potential users of the seventh embodiment 186 will be attracted to its "green energy" electricity generation which is complemented by the biodegradable natural material of its cylindrical housing 188. Such potential users will also prefer its re-chargeable batteries over disposable alkaline batteries.

Further Modifications of the Reminder Device

It will be understood by persons skilled in the art that the inventive subject matter can be implemented in various forms different from those so far described and illustrated in the present application. The following paragraphs describe a number of further modifications and adaptations of the reminder device for exemplary purposes. These, and other modifications and adaptations not expressly described and/or illustrated herein, are within the spirt and scope of the inventive subject matter.

The configuration and shape of the housing that encloses the printed circuit board and supports the display and the push button switches can be further varied. For example, the housing can be spherical, disc-shaped, or heart-shaped or some other shape. The housing can be fabricated in different eye-catching colors. The front face of the outer housing of the reminder device can include structure providing a miniature picture frame or other means (not illustrated) for removably receiving and holding a small hard copy photo of, for example, the user's mother.

The reminder device of the inventive subject matter can employ a wide variety of user-equipment interface utilities that allow for the communication of commands from users to electronic devices. For example, a slide switch, a toggle switch, a silicone keypad type switch, a membrane switch, a resistance touch switch, a piezo touch switch, and other conventional manually actuable switch means can be used in place of the push button switches 18 and 20. The manually actuated switches can be capacitive switches that are capable of being triggered by touching or without touching when the tip of a user's finger is in close enough proximity with the capacitive switch. The capacitance of the human body is sufficient to trigger this type of switch. Some switches are actuated through the use of a stylus. Other touchless switches can be utilized that detect motion such as the waving of a person's hand in front of the switch. One example that can be utilized in our reminder device uses a passive infrared ("PIR") sensor. A PIR sensor is sensitive to a person's skin temperature through the detection of black body radiation emitted at mid-infrared wavelengths. Therefore, as used herein, the term "manually actuable switch" includes, but is not limited to, switches that are physically manipulated by the user, as well as capacitive switches, touch-screens, motion sensors, and other switches that do not require physical contact with the user's hand, thumbs or fingers. The reminder device can include other means for receiving user input via interaction with externally connected devices.

The ACTION COMPLETED push button switch can be installed on the underside of the housing so that the user can push on the top of the housing to indicate to the reminder device that the task has once again been completed. Thus it is not necessary for the user to directly physically touch any part of the ACTION COMPLETED switch.

The reminder device of the inventive subject matter can be manufactured and sold with, or without, a battery, and with, or without, a means for connecting an external power source. Therefore, as used herein, the term "power source connected to the circuitry" refers to various means for powering the circuitry including, but is not limited to, a non-removable battery, a removable battery, electrical contacts for mating with a removable battery, inductive charging components, a power jack in the housing for removably connecting an external AC/DC power converter, and an AC/DC power supply circuit inside the reminder device that is permanently or removably connected to a conventional 110-volt AC power cord.

The reminder device 10 (FIGS. 1 and 2) can be programmed so that predetermined operations of one of the two push button switches 18 and 20 can be recognized as ON and OFF commands. For example, pressing, and not releasing, the ACTION COMPLETED push button switch 18 for a period of at least five seconds can be recognized as an ON command. A subsequent similar operation of the ACTION COMPLETED push button switch 18 can then be recognized as an OFF command. Alternatively, the reminder device 10 can be programmed to recognize simultaneous actuation of both push button switches 18 and 20 as an ON command and, when later done again, as an OFF command. The push button switches can be operable in conjunction with each other to execute more complex functions.

The operation program of the reminder device can enable the user to name the activity being tracked, and view analytics related to the user's tracked activity. It can also allow the user to remotely configure the reminder device to readily connect to a nearby combination Internet modem and Wi-Fi router. In addition, the operation program can allow the user to program in a specific goal time or a time range within which the user desires to complete the assigned task. The goal time can be used to perform useful analytics on the logged data.

Table II set forth hereafter illustrates a sample progress report which can be locally generated and displayed on the reminder device 10. This progress report incorporates the goal time that has been programmed by the user for the assigned Action. The operation program determines if the user is getting closer to the goal time or further away from the goal time. The progress report concludes with an appropriate message that encourages better habits regarding completion of the assigned Action based on the foregoing determination.

TABLE II

Here is your latest monthly progress report:

| | |
|---|---|
| assigned Action goal: | every 4 days |
| average recent frequency: | 4.8 days |
| longest recent interval: | 7 days |
| shortest recent interval: | 3 days |
| historical average frequency: | 6.2 days |
| You are getting closer to your goal! | |

The programmed goal time can be used to change the displayed elapsed time from green, when less than 100%, to yellow, when more than 100% of the goal time. Rather than an abrupt change from green to yellow, the color can change gradually in hue from green to yellow. It is preferable that the user be gently notified that the elapsed time has exceeded the goal time. An abrupt notification. e.g. by a red warning time, a flashing warning time, or an audible alarm, might be annoying or intimidating, and therefore, counterproductive.

A large number of reward messages can be pre-programmed into the non-volatile memory of the reminder device. The reward messages shown on the display upon each task completion can continually change in terms of wording, graphics, and/or animation in order to maintain user interest. Besides animated stick figures, the visible reward messages can include other inspiring animations such as simulated fireworks or floating balloons. An audio reward message in the form of a synthesized voice that announces "Good job!" can be delivered each time the ACTION COMPLETED push button switch is pressed. Alternatively, or in addition to the foregoing, the reminder device can play a short string of musical notes reminiscent of an inspiring melody each time the ACTION COMPLETED push button switch is manually actuated.

The yellow LED 42 (FIG. 1) can be eliminated, and instead, a low battery warning can be shown on the display 16. The batteries 82 (FIG. 6) can be any conventional type available for purchase from retail outlets including AAA alkaline, NiCad, Ni-MH, and LiPo type batteries. Button or coin cell alkaline batteries can be advantageously used as the power source if small size is needed. The battery charge level can be indicated on the display 16 (FIG. 5) by an alphanumeric message or a bar graph (not illustrated). A re-chargeable battery in the reminder device 66 can be inductively charged through an induction coil (not illustrated) connected to the circuitry. In other words, the reminder device can be modified so that it can be wirelessly charged.

The operation program can allow an inadvertent or unintended actuation of the ACTION COMPLETED push button switch 18 to be cancelled. This cancellation can be effectuated by appropriate actuation of the MENU push button switch 20. The true elapsed time since the last completion of the assigned task can then be restored. This ensures against skewing the analytics if, for example, a child was to push the ACTION COMPLETED push button switch 18 without the permission of his or her parent.

The reminder device 10 displays time in elapsed minutes, hours and days. Most routine tasks normally only need to be completed once every few days, or in some cases, once every 24 hours. However, the reminder device 10 can initially display the elapsed time in the minutes and seconds so that the user knows that the reminder device 10 is working. Once a predetermined time has elapsed from the last manual actuation of the ACTION COMPLETED push button switch 18, e.g. one hour, the display can then display the elapsed time in only hours and days, or eventually, just in days, to simplify the passive reminders and/or to conserve battery power.

Elapsed time (count-up) in days can be indicated with a graphical representation of elapsed time (not illustrated), such as a progress bar with an associated scale, or a graphic hourglass, instead of, or in addition to, alphanumeric characters. Elapsed time (count-up) in days can also be displayed in other graphical formats such as a monthly calendar with days of the week highlighted to indicate the number of inactive days since the task was last completed. Alternatively, a graphic calendar can have days highlighted on which the assigned Action was completed to effectuate showing the elapsed time (count-up) in days.

Instead of using an on-chip integrated antenna the Wi-Fi transceiver 46 can utilize an external antenna (not illustrated) to increase the operating range and/or data rate of the reminder device 10. The external antenna can be concealed inside the housing 12 or it can extend outside the housing 12. It can also be mounted so that it can pivot or retract. Where the antenna extends outside the housing 12 carbon fibers can be included in the thermoplastic material from which the housing 12 is molded. The carbon fibers shield the internal electronic components of the reminder device 10 from electromagnetic interference/radio frequency interference ("EMI/RFI").

The operation program can allow the user to categorize the assigned Action. For example, where the assigned Action is "running", the user can classify the assigned Action as LONG versus SHORT. The category can be selected via manual actuation of the MENU push button switch 20. Each time the ACTION COMPLETED push button switch 18 is manually actuated the reminder device 10 still commences a new count-up on the display. The data is logged and the user receives a reward message depending on the category of the assigned Action that was completed. For example a LONG run receives a "really great job" reward whereas a SHORT run receives simply a "keep it up" reward message.

The use potential use cases identified in Table I are ones in which decreasing the time intervals between completions of the assigned Action can generally be beneficial. There are cases where it is desirable for a user to increase the interval between completions of an assigned Action. For example, the reminder device can be configured to serve as an attention span trainer. The user may desire to increase the time between breaks at work or increase the time between checking his or her smartphone for messages. The device can have two push button switches, one for COULDN'T RESIST DISTRACTION and another one for RESISTED DISTRACTION.

Manual actuation of the former push button switch initiates a new count-up on the display and gives the user a motivational reminder to stay focused. Manual actuation of the latter push button switch does not initiate a new count-up and instead is logged in the stored data and causes the device to display a "good job" message.

The reminder device can have more than one ACTION COMPLETED push button switch. It can track completions of the assigned Action by different members of the household. For example, a reminder device can have two ACTION COMPLETED push button switches, one labeled HUSBAND and one labeled WIFE. This reminder device can be assigned to joint chores such as cleaning a filter in a room air purifier. The person completing the task receives the credit which is indicated on the display in both the reward message and the progress reports.

The remote control can include a Bluetooth or Wi-Fi transmitter for sending user commands and the reminder device can include a compatible wireless receiver including an RF detector for receiving the commands. This implementation avoids any necessity for the remote control to be pointed at the reminder device. In other words, this type of remote control eliminates the need for the reminder device to be in the line of sight of infrared emissions as is the case with the sixth embodiment illustrated in FIG. 11.

As already alluded to, the reminder device of the inventive subject matter disclosed herein can be configured as an Internet of things ("IoT") device. This allows it to be sensed and/or controlled remotely across existing network infrastructure. Improved efficiencies are achieved when our electronic passive reminder device is integrated into the functionality of other external computing devices such as lap tops, tablets and smartphones. It should be understood, however, that our electronic passive reminder device can be configured to function as a standalone device, i.e. a self-contained unit capable of operating without external hardware or software, and without any external input other than user commands inputted via a manually actuable switch, a motion sensor, an audio receiver, a photodetector, an RF receiver, or other command input means.

CONCLUSION

While various embodiments and modifications of our inventive subject matter have been described and illustrated, it should be apparent to those skilled in the art that many more modifications besides those already described and illustrated are possible without departing from the inventive subject matter. Therefore, our inventive subject matter is not to be restricted except in the spirit of the present disclosure. Moreover, in interpreting the disclosure, all terms should be interpreted in the broadest possible manner consistent with the context of our inventive subject matter. In particular, the terms "comprises" and "comprising" should be interpreted as referring to elements, components, or steps in a nonexclusive manner, indicating that the referenced elements, components, or steps can be present, or utilized, or combined with other elements, components, or steps that are not expressly referenced. The sub-headings within the DETAILED DESCRIPTION section of this application are included merely for the convenience of the reader and are not meant to characterize or otherwise limit the spirit of the disclosure. Therefore, to reiterate, the protection afforded our inventive subject matter shall only be limited in accordance with the scope of the following claims.

We claim:

1. An electronic passive reminder device, comprising:
a housing;
a display mounted in the housing for showing an elapsed time;
a first manually actuable switch mounted in the housing;
a second manually actuable switch mounted in the housing; and
circuitry mounted in the housing including control and data processing circuitry and a data storage connected to the control and data processing circuitry, the control and data processing circuitry being configured to execute an operation program stored in the data storage to enable a user to manually actuate the first switch to cause the display to show a count-up in the form of an elapsed time shown in days since a routine task was last completed, to enable the user to manually actuate the first switch again when the user subjectively determines that too long of an interval has elapsed, and after the task has been completed again, so that a new count-up of elapsed time is shown on the display, and to further enable the user to manually actuate the second switch to selectively show on the display a form of data representative of a plurality of historical intervals between actual successive completions of the task, wherein the form of data is selected from the group consisting of the average time between completions of the assigned task, the median time between completions of the assigned task, and the days of the week in which the user completed the assigned task the most frequently.

2. The electronic passive reminder device of claim 1, and further comprising a wireless-transmitter operatively connected to the circuitry to enable the form of data to be shown on an external computing device.

3. The electronic passive reminder device of claim 1 and further comprising a data port operatively connected to the circuitry to enable the form of data to be shown on an external computing device, the data port selected from the group consisting of a USB port and a memory card slot.

4. The electronic passive reminder device of claim 1 wherein the first manually actuable switch includes an actuating member forming an entire upper portion of the housing.

5. A reminder device, comprising:
a display that can show an elapsed time since an assigned action was last completed;
a user command input mechanism;
circuitry connected to the display and the user command input mechanism that can execute an operation program that initiates the elapsed time on the display when the user inputs a first command through the user command input mechanism after completion of the assigned action, and that enables the user to input the first command again when the user determines that a sufficient amount of time has elapsed, and after the assigned action has been completed again, so that a new elapsed time is initiated on the display; and
a data transfer device operatively connected to the circuitry that enables a form of historical data to be shown on an external computing device that enables the user to monitor the user's progress toward a goal of completing the assigned action with a desired frequency, wherein the form of historical data is selected from the group consisting of the average time between completions of the assigned task, the median time between completions of the assigned task, and the days of the week in which the user completed the assigned task the most frequently.

6. The reminder device of claim 5 wherein the data transfer device is selected from the group consisting of a wireless transmitter, a USB port, and a memory card slot.

7. The reminder device of claim 5 and further comprising a housing supporting the display and containing the circuitry, and an action identifier on an exterior of the housing and not shown on the display that represents the assigned action.

8. The reminder device of claim 5 wherein the operation program is configured to show a reward on the display after the assigned action has been completed again, the reward selected from the group consisting of wording, graphics, animation, and audible sounds.

9. The reminder device of claim 5 wherein the operation program is configured so that the display shows the form of historical data when the user inputs a second command through the user command input mechanism.

10. The reminder device of claim 9 wherein the user command input mechanism includes a first switch that is manually actuable to input the first command that causes the new elapsed time to be initiated on the display and a second switch that is manually actuable to input the second command that causes the display to show the form of historical data.

11. A reminder device, comprising:
a display that can show an elapsed time since an assigned task was last completed;
a user command input mechanism; and
circuitry connected to the display and the user command input mechanism that can execute an operation program that initiates the elapsed time on the display when the user inputs a first command through the user command input mechanism after completion of the assigned task, and that enables the user to input the first command again when the user determines that a sufficient amount of time has elapsed, and after the assigned task has been completed again, so that a new elapsed time is initiated on the display, and wherein the operation program is configured so that when the user inputs a second command through the user command input mechanism the display shows a form of historical data that enables the user to monitor the user's progress toward a goal of completing the assigned task with a desired frequency, wherein the form of historical data is selected from the group consisting of the average time between completions of the assigned task, the median time between completions of the assigned task, and the days of the week in which the user completed the assigned task the most frequently.

12. The reminder device of claim 11 and further comprising a data transfer device operatively connected to the circuitry that enables the form of historical data to be displayed on an external computing device.

13. The reminder device of claim 12 wherein the data transfer device is selected from the group consisting of a wireless transmitter, a USB port, and a memory card slot.

14. The reminder device of claim 11 and further comprising a housing supporting the display and containing the circuitry, and an action identifier on an exterior of the housing and not shown on the display that represents the assigned task.

15. The reminder device of claim 11 wherein the user command input mechanism includes a first switch that is manually actuable to input the first command that causes the new elapsed time to be initiated on the display and a second switch that is manually actuable to input the second command that causes the display to show the form of historical data that enables the user to monitor the user's progress toward a goal of completing the assigned task with a desired frequency.

16. The reminder device of claim 11 wherein the operation program is configured to generate a reward that is shown on the display when the user inputs the first command through the user command input mechanism after completion of the assigned task, the reward selected from the group consisting of wording, graphics, animation, and audible sounds.

17. The reminder device of claim 11 wherein the operation program is configured to generate a progress report upon receipt of a third command from the user.

18. The reminder device of claim 11 wherein the form of historical data is shown in graphic form.

19. The reminder device of claim 11 wherein the user command input mechanism includes a speech recognition module.

20. The reminder device of claim 11 wherein the user command input mechanism includes a remote control.

* * * * *